US010701451B2

(12) United States Patent
Chen et al.

(10) Patent No.: US 10,701,451 B2
(45) Date of Patent: Jun. 30, 2020

(54) PROGRAM INTERACTION SYSTEM, METHOD, CLIENT, AND BACKEND SERVER

(71) Applicant: TENCENT TECHNOLOGY (SHENZHEN) COMPANY LIMITED, Shenzhen (CN)

(72) Inventors: Shengpeng Chen, Shenzhen (CN); Chang Su, Shenzhen (CN); Tengjian Li, Shenzhen (CN); Yuan Huang, Shenzhen (CN); Jiayu Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/988,356

(22) Filed: May 24, 2018

(65) Prior Publication Data
US 2018/0270541 A1  Sep. 20, 2018

Related U.S. Application Data

(63) Continuation of application No. PCT/CN2017/077233, filed on Mar. 20, 2017.

(30) Foreign Application Priority Data

Apr. 22, 2016  (CN) .......................... 2016 1 0258034

(51) Int. Cl.
H04N 21/482 (2011.01)
H04N 21/84 (2011.01)
(Continued)

(52) U.S. Cl.
CPC ........... *H04N 21/482* (2013.01); *G06F 3/016* (2013.01); *H04N 21/26291* (2013.01);
(Continued)

(58) Field of Classification Search
CPC .. H04N 21/482; H04N 21/84; H04N 21/4312; H04N 21/26291; H04N 21/41407; H04N 21/4784; H04N 21/6582
See application file for complete search history.

(56) References Cited

U.S. PATENT DOCUMENTS

2008/0141305 A1    6/2008  Zhao
2013/0212610 A1*   8/2013  Hussain ................. G06Q 30/06
                                                          725/23
(Continued)

FOREIGN PATENT DOCUMENTS

CN    102917255 A    2/2013
CN    103024581 A    4/2013
(Continued)

OTHER PUBLICATIONS

International Search Report dated May 23, 2017 in PCT/CN2017/077233, filed Mar. 20, 2017 (w/ English translation) 5 pp.
(Continued)

*Primary Examiner* — Yassin Alata
(74) *Attorney, Agent, or Firm* — Oblon, McClelland, Maier & Neustadt, L.L.P.

(57) ABSTRACT

The present disclosure discloses a program interaction method. In the disclosed method, a backend server receives interaction information of a program from a program provider client and program information of a currently watched program from a program viewer client. After receiving the interaction information and the program information, the backend server determines the interaction information that corresponds to the program information and sends the interaction information and a resource gifting interface to the program viewer client. The program viewer client subsequently sends a resource gifting instruction through the
(Continued)

resource gifting interface to the backend server to transfer a resource to a performer of the program.

20 Claims, 14 Drawing Sheets

(51) Int. Cl.
    *G06F 3/01*     (2006.01)
    *H04N 21/431*     (2011.01)
    *H04N 21/414*     (2011.01)
    *H04N 21/658*     (2011.01)
    *H04N 21/262*     (2011.01)
    *H04N 21/4784*     (2011.01)
    *H04L 12/58*     (2006.01)

(52) U.S. Cl.
    CPC ... *H04N 21/41407* (2013.01); *H04N 21/4312* (2013.01); *H04N 21/4784* (2013.01); *H04N 21/6582* (2013.01); *H04N 21/84* (2013.01); *H04L 51/063* (2013.01)

(56) References Cited

U.S. PATENT DOCUMENTS

2015/0121409 A1     4/2015   Zhang et al.
2015/0134556 A1*   5/2015   Spinner .............. G06Q 30/0279
                                                                                        705/329
2016/0050458 A1*   2/2016   Layton ............... H04N 21/2665
                                                                                        725/5
2016/0275588 A1     9/2016   Ye et al.
2017/0280189 A1     9/2017   Ye et al.
2018/0012308 A1     1/2018   Zha et al.

FOREIGN PATENT DOCUMENTS

CN         104093079 A     10/2014
CN         104159136 A     11/2014
CN         105337843 A     2/2016
CN         105933739 A     9/2016
EP           1928177 A1     6/2008
WO     WO20150166095     * 11/2015

OTHER PUBLICATIONS

Chinese Office Action dated Jul. 3, 2018 in Application No. 201610258034.X (partial English translation), 19 pages.
Chinese Office Action dated Mar. 2, 2019 in Application No. 201610258034.X (partial English translation), 19 pages.
PCT International Preliminary Report dated Oct. 23, 2018 in Application No. PCT/CN2017/077233 with partial English translation, 5 pages.
PCT Written Opinion dated May 23, 2017 in Application No. PCT/CN2017/077233 with English translation, 9 pages.

* cited by examiner

PROGRAM INTERACTION SYSTEM, METHOD, CLIENT, AND BACKEND SERVER This application is a continuation of International Application No. PCT/CN2017/077233, filed on Mar. 20, 2017, which claims priority to China Patent Application 201610258034.X, filed with the Chinese Patent Office on Apr. 22, 2016 and entitled "PROGRAM INTERACTION SYSTEM, METHOD, CLIENT, AND BACKEND SERVER". The entire disclosures of the prior applications are hereby incorporated by reference in their entirety.

FIELD OF THE TECHNOLOGY

This application relates to the field of computer and Internet technologies.

BACKGROUND OF THE DISCLOSURE

In order to make users more enthusiastic when watching a TV program, listening to a radio program, or attending a live show, interaction activities with the users can be carried out during the program, so that the users are really involved in the program.

A program interaction method provided in a related technology includes: a TV station that publishes an SMS (Short Message Service) message-based participation approach of an interaction activity when broadcasting a live show, and a user that can send an SMS message to participate in the interaction activity and pay an amount of money to a performer of the program by paying an expensive SMS fee. For example, if a participation approach of an interaction activity in a program is "For China Mobile users, please send a text message "10" to 12345", a user can open an SMS application in a terminal, edit a new text message "10", set "12345" as the receiver of the text message, and send the text message, to participate in the interaction activity.

When participating in an interaction activity by sending a text message, a user needs to manually input content of the text message, which makes it difficult to participate in the interaction activity.

SUMMARY

In order to solve the problem that an SMS message-based participation approach decreases participation efficiency and convenience of an interaction activity, embodiments of this application provide a program interaction system, method, client and backend server. The technical solutions are as follows:

According to a first aspect, a program interaction system is provided. The system includes: a program provider client, a backend server, and a program viewer client, where the program provider client is configured to send interaction information of a program to the backend server;

the program viewer client is configured to send program information of a currently watched program to the backend server;

the backend server is configured to determine interaction information corresponding to the program information, and send the interaction information to the program viewer client;

the program viewer client is further configured to display the interaction information and a resource gifting entry (or interface), the resource gifting interface being an operation entry for gifting a resource to a performer of the program;

the program viewer client is further configured to send a resource gifting instruction to the backend server according to a resource gifting operation triggered based on the resource gifting entry; and the backend server is further configured to execute the resource gifting instruction.

According to a second aspect, a program interaction method is provided. The method is applied to a system including a program provider client, a backend server and a program viewer client, and includes:

sending, by the program provider client, interaction information of a program to the backend server;

sending, by the program viewer client, program information of a currently watched program to the backend server;

determining, by the backend server, interaction information corresponding to the program information, and sending the interaction information to the program viewer client;

displaying, by the program viewer client, the interaction information and a resource gifting entry, the resource gifting entry being an operation entry for gifting a resource to a performer of the program;

sending, by the program viewer client, resource gifting instruction to the backend server according to a resource gifting operation triggered based on the resource gifting entry; and executing, by the backend server, the resource gifting instruction.

According to a third aspect, a non-transitory computer-readable storage medium having instructions stored thereon which when executed by a processor of a program viewer client cause the processor to perform operations for program interaction. The operations include sending program information of a currently watched program to a backend server and receiving interaction information from the backend server. The interaction information is associated with the program information. The operations further include displaying the interaction information and a resource gifting entry (or interface). The resource gifting interface is configured to receive a user request to transfer a resource to a performer of the program. Then the operations include sending a resource gifting instruction to the backend server according to a resource gifting operation triggered by the user request. The backend server is configured to execute the resource gifting instruction to transfer the resource to the performer of the program.

According to a fourth aspect, a program interaction method is provided. The method includes receiving interaction information of a program from a program provider client, receiving program information of a currently watched program from a program viewer client, and determining, by circuitry of a backend server. The interaction information corresponds to the program information. The method further includes sending the interaction information to the program viewer client, receiving, by the circuitry of the backend server, a resource gifting instruction from the program viewer client after the program viewer client displays the interaction information and a resource gifting interface that is configured to receive a user request to transfer a resource to a performer of the program. The resource gifting instruction is received when a resource gifting operation is triggered by the user request. The method includes executing the resource gifting instruction to transfer the resource to the performer of the program.

According to a fifth aspect, a program interaction system is provided. The system includes: a playing device, a backend server and a client, where the client is configured to send an interaction request to the playing device when the playing device is playing a program;

the playing device is configured to send program information of the currently played program to the backend server;

the backend server is configured to determine, from pre-stored interaction information, interaction information corresponding to the program information, and send the interaction information to a display device, the display device being the playing device or the client;

the display device is configured to display the interaction information;

the client is configured to display a resource gifting entry, and send a resource gifting instruction to the backend server according to a resource gifting operation triggered based on the resource gifting entry, the resource gifting entry being an operation entry for gifting a resource to a performer of the program; and the backend server is further configured to execute the resource gifting instruction.

According to a sixth aspect, a program interaction method is provided. The method is applied to a system including a playing device, a backend server and a client, and includes:

sending, by the client, an interaction request to the playing device when the playing device is playing a program;

sending, by the playing device, program information of the currently played program to the backend server;

determining, by the backend server from pre-stored interaction information, interaction information corresponding to the program information, and sending the interaction information to a display device, the display device being the playing device or the client;

displaying, by the display device, the interaction information;

displaying, by the client, a resource gifting entry, and sending a resource gifting instruction to the backend server according to a resource gifting operation triggered based on the resource gifting entry, the resource gifting entry being an operation entry for gifting a resource to a performer of the program; and executing, by the backend server, the resource gifting instruction.

According to a seventh aspect, a non-transitory computer-readable storage medium having instructions stored thereon which when executed by a processor of a client cause the processor to perform operations for program interaction. The operations include sending an interaction request to a playing device when the playing device is playing a program, where the interaction request instructs the playing device to send program information of the currently played program to a backend server, and the backend server is configured to determine, from pre-stored interaction information, the interaction information that corresponds to the program information and send the interaction information to the playing device or the client. The operations also include displaying a resource gifting interface that is configured to receive a user request to transfer a resource to a performer of the program, and sending a resource gifting instruction to the backend server according to a resource gifting operation triggered by the user request. The backend server is configured to execute the resource gifting instruction to transfer the resource to the performer of the program.

According to an eighth aspect, a program interaction method is provided. The method includes receiving program information of a currently played program from a playing device, where the program information is sent by the playing device after the playing device receives an interaction request from a client. The method also includes determining, from pre-stored interaction information interaction information that corresponds to the program information, and sending the interaction information to the playing device or the client for display. The method further includes receiving, by circuitry of a backend server, a resource gifting instruction from the client, where the resource gifting instruction is sent by the client to the backend server according to a resource gifting operation triggered by a user request that is received by a resource gifting interface displayed by the client, and the resource gifting interface is configured to receive the user request to transfer a resource to a performer of the program. The method further includes executing the resource gifting instruction to transfer the resource to the performer of the program.

According to a ninth aspect, a client is provided. The client includes a processor and a memory, the memory stores an instruction executable by the processor, and when executing the instruction, the processor is configured to:

send program information of a currently watched program to a backend server;

receive interaction information sent by the backend server, the interaction information corresponding to the program information;

display the interaction information and a resource gifting entry, the resource gifting entry being an operation entry for gifting a resource to a performer of the program; and send a resource gifting instruction to the backend server according to a resource gifting operation triggered based on the resource gifting entry, the backend server being configured to execute the resource gifting instruction.

According to a tenth aspect, a backend server is provided. The backend server includes processing circuitry configured to receive interaction information of a program from a program provider client and receive program information of a currently watched program from a program viewer client. The processing circuitry is also configured to determine the interaction information corresponds to the program information, and send the interaction information to the program viewer client. The processing circuitry is further configured to receive a resource gifting instruction from the program viewer client after the program viewer client displays the interaction information and a resource gifting interface that is configured to receive a user request to transfer a resource to a performer of the program. The resource gifting instruction is sent when a resource gifting operation is triggered by a user request The processing circuitry is further configured to execute the resource gifting instruction to transfer the resource to the performer of the program.

According to an eleventh aspect, a client is provided. The client includes a processor and a memory, the memory stores an instruction executable by the processor, and when executing the instruction, the processor is configured to:

send an interaction request to a playing device when the playing device is playing a program, the interaction request being used for instructing the playing device to send program information of the currently played program to a backend server, the backend server being configured to determine, from pre-stored interaction information, interaction information corresponding to the program information and send the interaction information to a display device for displaying, and the display device being the playing device or the client; and display a resource gifting entry, and send a resource gifting instruction to the backend server according to a resource gifting operation triggered based on the resource gifting entry, the backend server being configured to execute the resource gifting instruction, and the resource gifting entry being an operation entry for gifting a resource to a performer of the program.

According to a twelfth aspect, a backend server is provided. The backend server includes processing circuitry configured to receive program information of a currently played program from a playing device, where the program information is sent by the playing device after the playing device receives an interaction request from a client. The processing circuitry is also configured to determine, from pre-stored interaction information, interaction information that corresponds to the program information, and send the interaction information to the playing device or the client. The processing circuitry is further configured to receive a resource gifting instruction from the client where the resource gifting instruction is sent by the client to the backend server according to a resource gifting operation triggered by a user request that is received by a resource gifting interface displayed by the client, and the resource gifting interface is configured to receive the user request to transfer a resource to a performer of the program. The processing circuitry is further configured to execute the resource gifting instruction to transfer the resource to the performer of the program.

BRIEF DESCRIPTION OF THE DRAWINGS

To describe the technical solutions of the embodiments of this application more clearly, the following briefly introduces the accompanying drawings required for describing the embodiments. The accompanying drawings in the following descriptions show only some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes the implementations of this application in detail with reference to the accompanying drawings.

Implementation Environment

Figure 1:
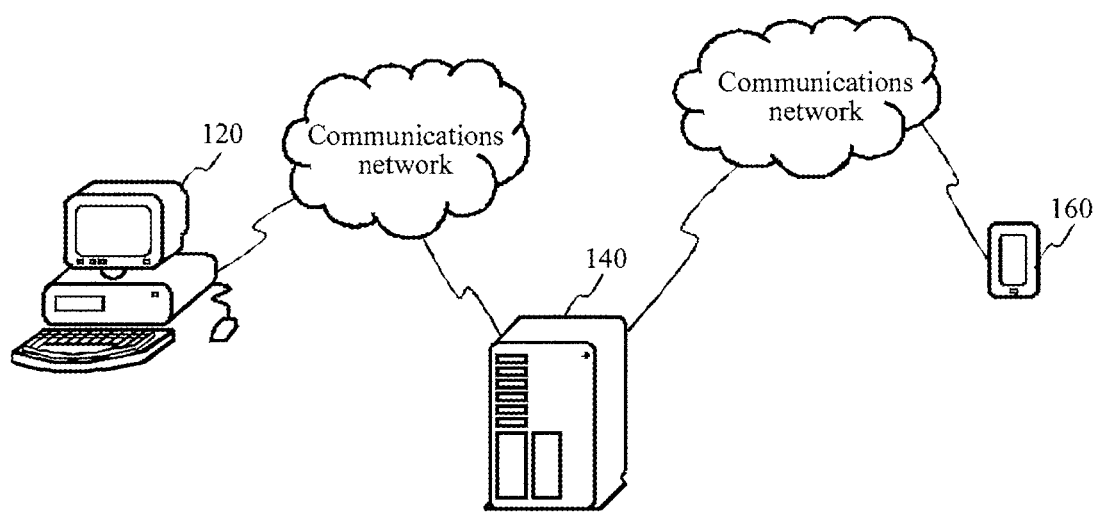
FIG. 1 is a schematic diagram of an implementation environment according to an embodiment of this application.

Referring to FIG. 1, FIG. 1 is a schematic diagram of an implementation environment related to an embodiment of this application. The implementation environment includes: a program provider terminal 120, a backend server 140 and a program viewer terminal 160. Communication connections are separately established between the program provider terminal 120 and the backend server 140 and between the program viewer terminal 160 and the backend server 140 by means of a communications network. The communications network may be a wired network or a wireless network.

The program provider terminal 120 is a terminal device used by a program provider. The program provider terminal 120 may be an electronic device such as a mobile phone, a tablet computer, an e-reader, a multimedia player, a laptop portable computer, or a desktop computer. A program provider client runs in the program provider terminal 120. The program provider client may be an application client or a webpage client. The program provider may log onto the backend server 140 by using the program provider client. When the program is a recorded program, the program and interaction information are released to the backend server 140; when the program is a live show, interaction information is released to the backend server 140.

The backend server 140 may be one server, a server cluster consisting of several servers, or a cloud computing service center.

The program viewer terminal 160 is a terminal device used by a program viewer. The program viewer terminal 160 may be an electronic device such as a mobile phone, a tablet computer, an e-reader, a multimedia player, a laptop portable computer, or a desktop computer. A program viewer client runs in the program viewer terminal 160. The program viewer client may be an application client or a webpage client. An ordinary user logs onto the backend server 140 by using the program viewer client, and obtains, from the backend server 140, the interaction information released by the program provider.

Figure 2:
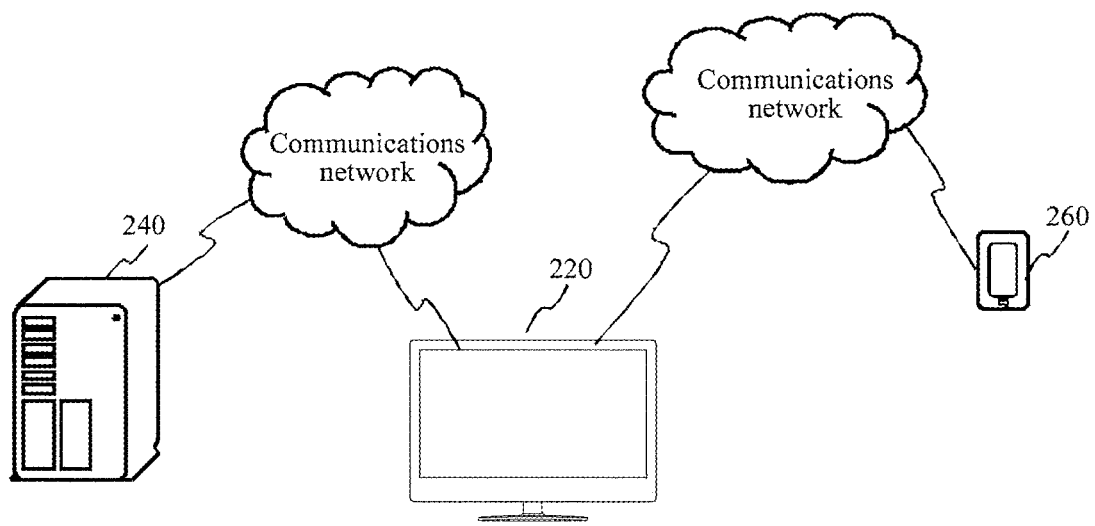
FIG. 2 is a schematic diagram of an implementation environment according to another embodiment of this application.

Referring to FIG. 2, FIG. 2 is a schematic diagram of an implementation environment related to another embodiment of this application. The implementation environment includes: a playing device 220, a backend server 240 and a program viewer terminal 260. Communication connections are separately established between the playing device 220 and the backend server 240 and between the program viewer terminal 260 and the backend server 240 by means of a communications network, or communication connections are separately established between the program viewer terminal 260 and the playing device 220 and between the backend server 240 and the playing device 220 by means of a communications network. The communications network may be a wired network or a wireless network.

The playing device 220 is a device having a playing function, and is a terminal device used by a program viewer. The playing device 220 may be an electronic device such as a TV, a mobile phone, a tablet computer, an e-reader, a multimedia player, a laptop portable computer, or a desktop computer.

The backend server 240 may be one server, a server cluster consisting of several servers, or a cloud computing service center.

The program viewer terminal 260 is a terminal device used by a program viewer. The program viewer terminal 260 may be an electronic device such as a mobile phone, a tablet computer, an e-reader, a multimedia player, a laptop portable computer, or a desktop computer. A client runs in the program viewer terminal 260. The client may be an application client or a webpage client. An ordinary user logs onto the backend server 140 by using the client, and obtains interaction information from the backend server 240.

Computer Architecture

Figure 3:
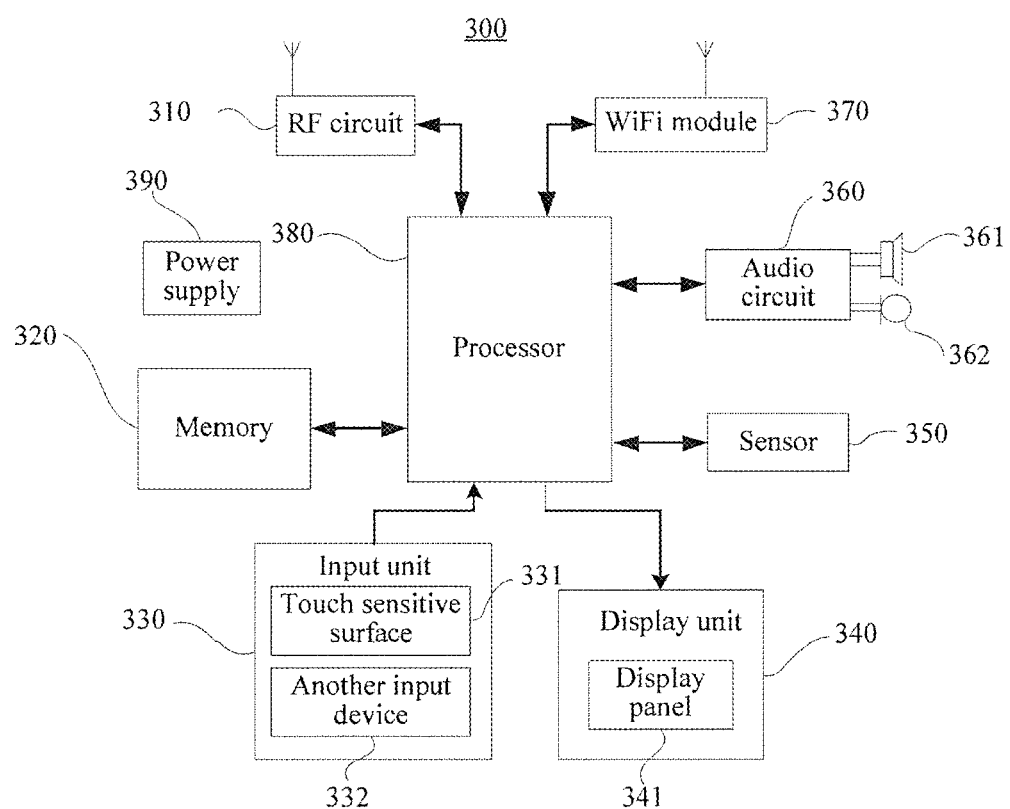
FIG. 3 is a schematic structural diagram of a terminal according to an embodiment of this application.

Referring to FIG. 3, FIG. 3 is a schematic structural diagram of a terminal according to an embodiment of this application. The terminal may be the program provider terminal 120 or the program viewer terminal 160 in the implementation environment shown in FIG. 1, or the playing device 220 or the program viewer terminal 260 in the implementation environment shown in FIG. 2. Specifically:

A terminal 300 may include components such as a radio frequency (RF) circuit 310, a memory 320 including one or more computer readable storage media, an input unit 330, a display unit 340, a sensor 350, an audio circuit 360, a WiFi module 370, one or more processors 380, and a power supply 390. A person skilled in the technology may understand that the structure of the terminal shown in FIG. 3 does not constitute a limitation to the terminal, and the terminal may include more or fewer components than those shown in the figure, or some components may be combined, or a different component deployment may be used.

The RF circuit 310 may be configured to receive and send a signal during information transmission and receiving. Especially, the RF circuit 310 sends, after receiving downlink information of a base station, the information to one or more processors 380 for processing, and sends related uplink data to the base station. Generally, the RF circuit 310 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 310 may also communicate with another device by means of wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 320 may be configured to store a software program and module, such as modules in FIGS. 14, 15, 18 and 19 described below. The processor 380 runs the software program and module stored in the memory 320, to implement various functional applications and data processing. The memory 320 may mainly include a program storage area and a data storage area. The program storage area may store an operating system, an application program required by at least one function (such as a sound playback function and an image display function), and the like. The data storage area may store data (such as audio data and an address book) created according to use of the terminal 300, and the like. In addition, the memory 320 may include a high speed random access memory, and may further include a non-volatile memory, such as at least one magnetic disk storage device, a flash memory, or other volatile solid-state storage devices. Correspondingly, the memory 320 may further include a memory controller, to provide access of the processor 380 and the input unit 330 to the memory 320.

The input unit 330 may be configured to receive input digit or character information, and generate a keyboard, mouse, joystick, optical or track ball signal input related to the user setting and function control. Specifically, the input unit 330 may include an image input device 331 and another input device 332. The image input device 331 may be a camera, or may be a photoelectric scanning device. In addition to the image input device 331, the input unit 330 may further include the another input device 332. Specifically, the another input device 332 may include, but is not limited to, one or more of a physical keyboard, a functional key (such as a volume control key or a switch key), a track ball, a mouse, and a joystick.

The display unit 340 may be configured to display information input by the user or information provided for the user, and various graphical user interfaces of the terminal 300. The graphical user interfaces may be formed by graphs, texts, icons, videos and any combination thereof. The display unit 340 may include a display panel 341. The display panel 341 may be configured by using a liquid crystal display (LCD), an organic light-emitting diode (OLED), or the like.

The terminal 300 may further include at least one sensor 350, such as an optical sensor, a motion sensor, and other sensors. Specifically, the light sensor may include an ambient light sensor and a proximity sensor. The ambient light sensor may adjust luminance of the display panel 341 according to brightness of the ambient light. The proximity sensor may switch off the display panel 341 and/or backlight when the terminal 300 is moved to the ear. As one type of motion sensor, a gravity acceleration sensor may detect magnitude of accelerations in various directions (generally triaxial), may detect magnitude and a direction of the gravity when static, and may be used for an application that recognizes the attitude of the mobile phone (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the terminal 300 are not further described herein.

The audio circuit 360, a loudspeaker 361, and a microphone 362 may provide audio interfaces between the user and the terminal 300. The audio circuit 360 may transmit, to the loudspeaker 361, an electric signal converted from received audio data. The loudspeaker 362 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to another terminal by using the RF circuit 310, or outputs the audio data to the memory 320 for further processing. The audio circuit 360 may further include an earphone jack, so as to provide communication between a peripheral earphone and the terminal 300.

WiFi is a short distance wireless transmission technology. The terminal 300 may help, by using the WiFi module 370, the user to receive and send emails, browse a web page, access streaming media, and so on, which provides wireless broadband Internet access for the user. Although FIG. 3 shows the WiFi circuit 370, it may be understood that the wireless communications unit is not a necessary component of the terminal 300, and when required, the wireless communications unit may be omitted as long as the scope of the essence of the present disclosure is not changed.

The processor 380 is a control center of the terminal 300, which is connected to various parts of the entire mobile phone by using various interfaces and lines, and by running or executing a software program and/or module stored in the memory 320 and calling data stored in the memory 320, to perform various functions of the terminal 300 and process data, so as to perform overall monitoring on the mobile phone. The processor 380 may include one or more processing cores. The processor 380 may integrate an application processor and a modem processor. The application processor mainly processes an operating system, a user interface, an application program, and the like. The modem processor mainly processes wireless communication. It may be understood that the foregoing modem processor may not be integrated into the processor 380.

The terminal 300 further includes the power supply 390 (such as a battery) for supplying power to the components. The power supply may be logically connected to the processor 380 by using a power management system, thereby implementing functions such as charging, discharging, and power consumption management by using the power management system. The power supply 390 may further include one or more of a direct current or alternating current power supply, a recharging system, a power failure detection circuit, a power supply converter or inverter, a power supply state indicator, and any other component.

Although not shown in the figure, the terminal 300 may further include a camera, a Bluetooth module, and the like, which are not described herein.

The terminal 300 further includes a memory and one or more programs. The one or more programs are stored in the memory and executed by one or more processors.

Figure 4:
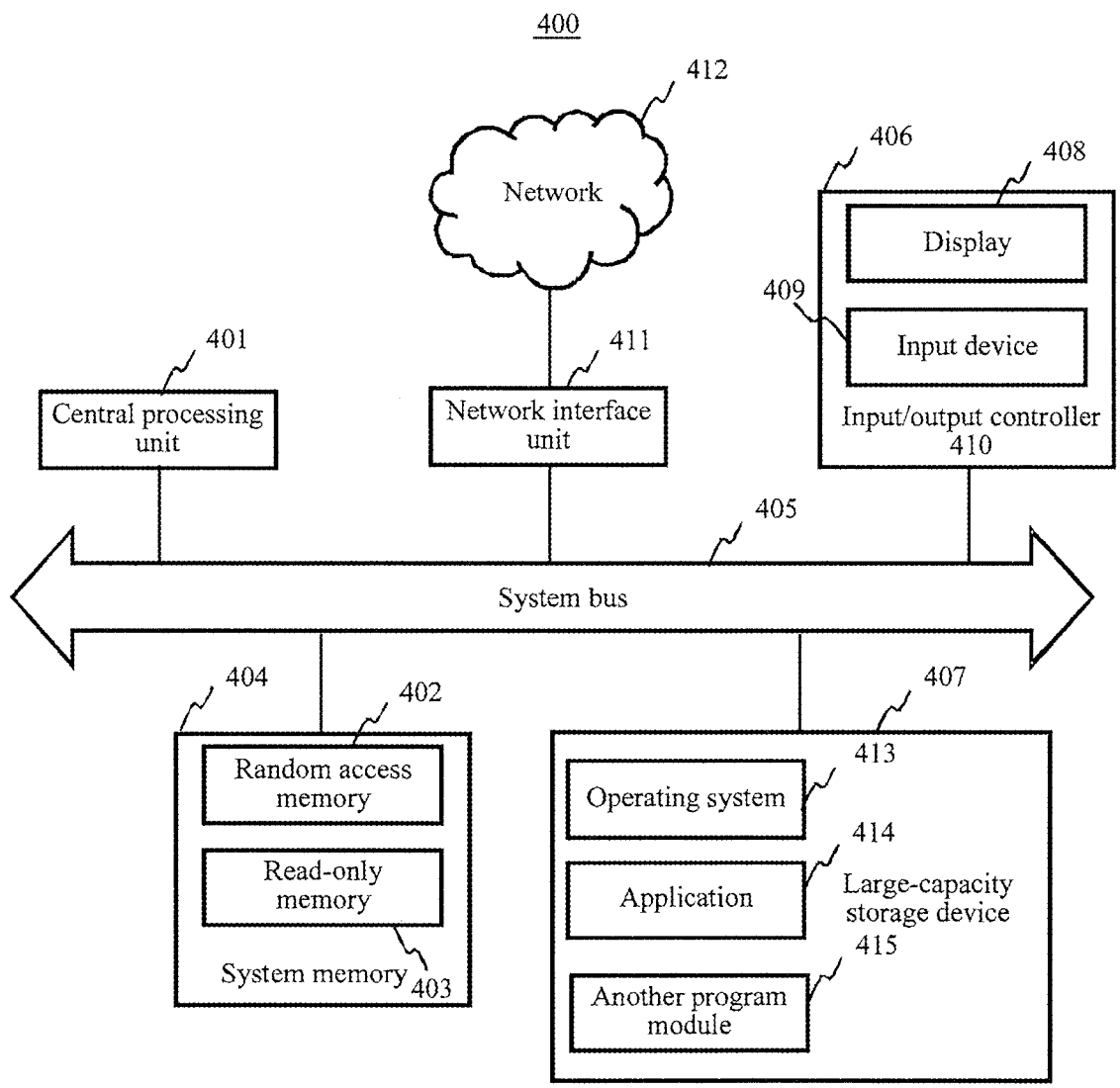
FIG. 4 is a schematic structural diagram of a server according to an embodiment of this application.

FIG. 4 is a schematic structural diagram of a server according to an embodiment of this application. The server may be the backend server 140 in the implementation environment shown in FIG. 1 or the backend server 240 in the implementation environment shown in FIG. 2. Specifically:

The server 400 includes a central processing unit (CPU) 401, a system memory 404 including a random access memory (RAM) 702 and a read-only memory (ROM) 403, and a system bus 405 connecting the system memory 404 and the CPU 401. The system memory 404 may be configured to store a software program and a module, such as modules in FIGS. 16, 17 and 20 described below. The CPU 401 executes various functional applications and data processing by running the software program and module stored in the system memory 404. The server 400 further includes a basic input/output system (I/O system) 406 assisting in transmitting information between devices in a computer, and a large-capacity storage device 407 configured to store an operating system 413, an application program 414 and another program module 415.

The basic I/O system 406 includes a display 408 configured to display information and an input device 409, such as a mouse or a keyboard, configured to input information for a user. The display 408 and the input device 409 are both connected to the CPU 401 by using an input and output controller 410 connected to the system bus 405. The basic I/O system 406 may further include the input and output controller 410 to receive and process inputs from multiple other devices such as a keyboard, a mouse, and an electronic stylus. Similarly, the input and output controller 410 further provides an output to a display screen, a printer or another type of output device.

The large-capacity storage device 407 is connected to the CPU 401 by using a large-capacity storage controller (not shown) connected to the system bus 405. The large-capacity storage device 407 and its associated computer readable medium provide non-volatile storage for the server 400. That is to say, the large-capacity storage device 407 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an erasable programmable read-only memory (EPROM), an electrically erasable programmable read-only memory (EEPROM), a flash memory or other solid-state storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 404 and the large-capacity storage device 407 may be collectively referred to as a memory.

According to the embodiments of this application, the server 400 may further be connected, by using a network such as the Internet, to a remote computer on the network and run. That is, the server 400 may be connected to a network 412 by using a network interface unit 411 connected to the system bus 405, or may be to connected to another type of network or remote computer system (not shown) by using the network interface unit 411.

The memory further includes one or more programs. The one or more programs are stored in the memory and configured to be executed by the CPU.

EMBODIMENTS

Figure 5:
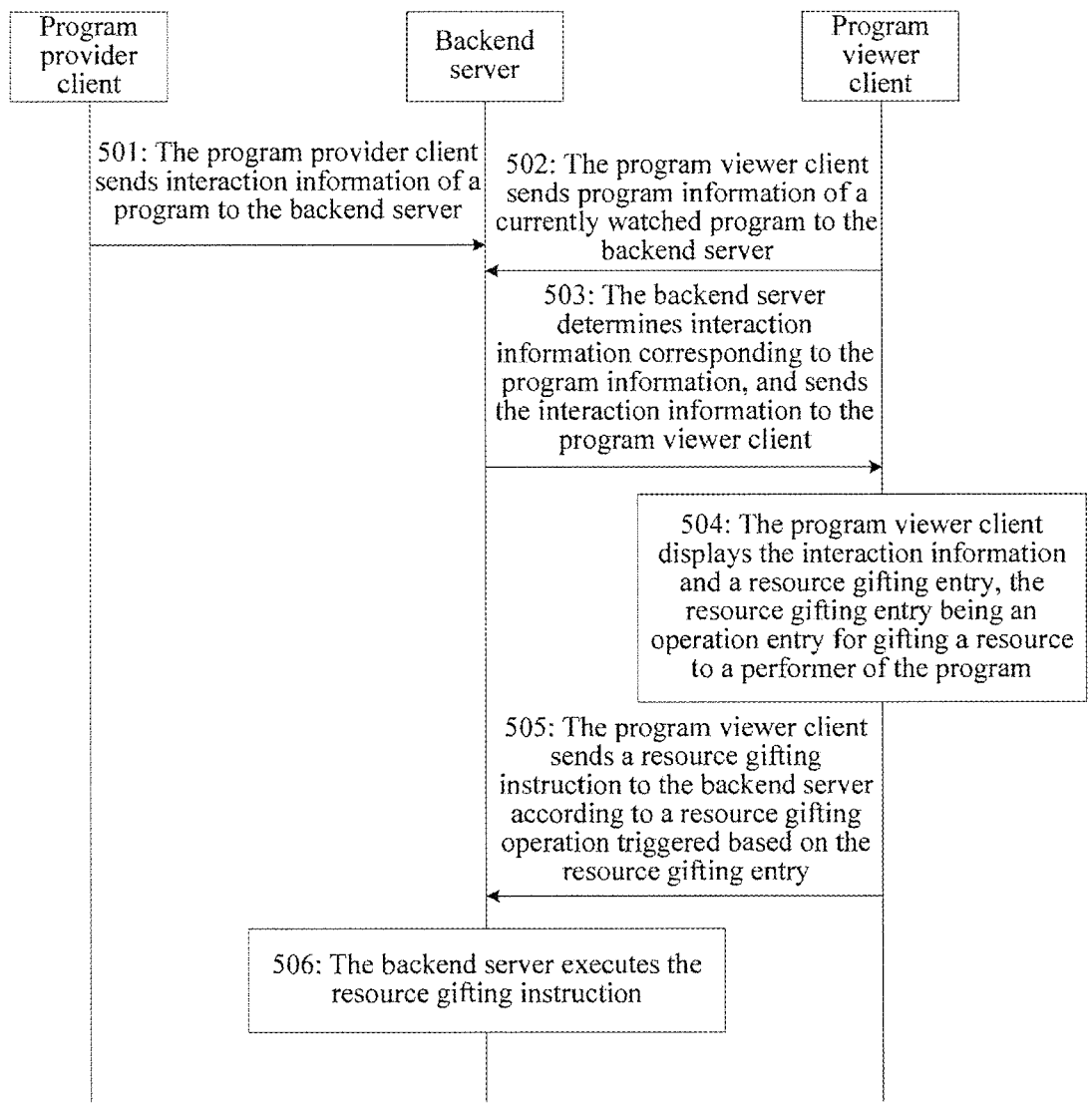
FIG. 5 is a method flowchart of a program interaction method according to an embodiment of this application.

Referring to FIG. 5, FIG. 5 is a method flowchart of a program interaction method according to an embodiment of this application. The program interaction method may be applied to the implementation environment shown in FIG. 1. The program interaction method includes the following steps:

Step 501: A program provider client sends interaction information of a program to a backend server.

Step 502: The program viewer client sends program information of a currently watched program to the backend server.

Step 503: The backend server determines interaction information corresponding to the program information, and sends the interaction information to the program viewer client.

Step 504: The program viewer client displays the interaction information and a resource gifting entry, the resource gifting entry being an operation entry for gifting a resource to a performer of the program.

Step 505: The program viewer client sends a resource gifting instruction to the backend server according to a resource gifting operation triggered based on the resource gifting entry.

Step 506: The backend server executes the resource gifting instruction.

Step 501 may be independently implemented as an embodiment on the program provider client side. Steps 503 and 506 may be independently implemented as an embodiment on the backend server side. Steps 502, 504 and 505 may be independently implemented as an embodiment on the program provider client side.

In conclusion, according to the program interaction method provided in this embodiment of this application, program information is sent to a backend server, and then interaction information and a resource gifting entry that correspond to the program can be obtained, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The method makes it more efficient and convenient to participate in an interaction activity.

Figure 6:
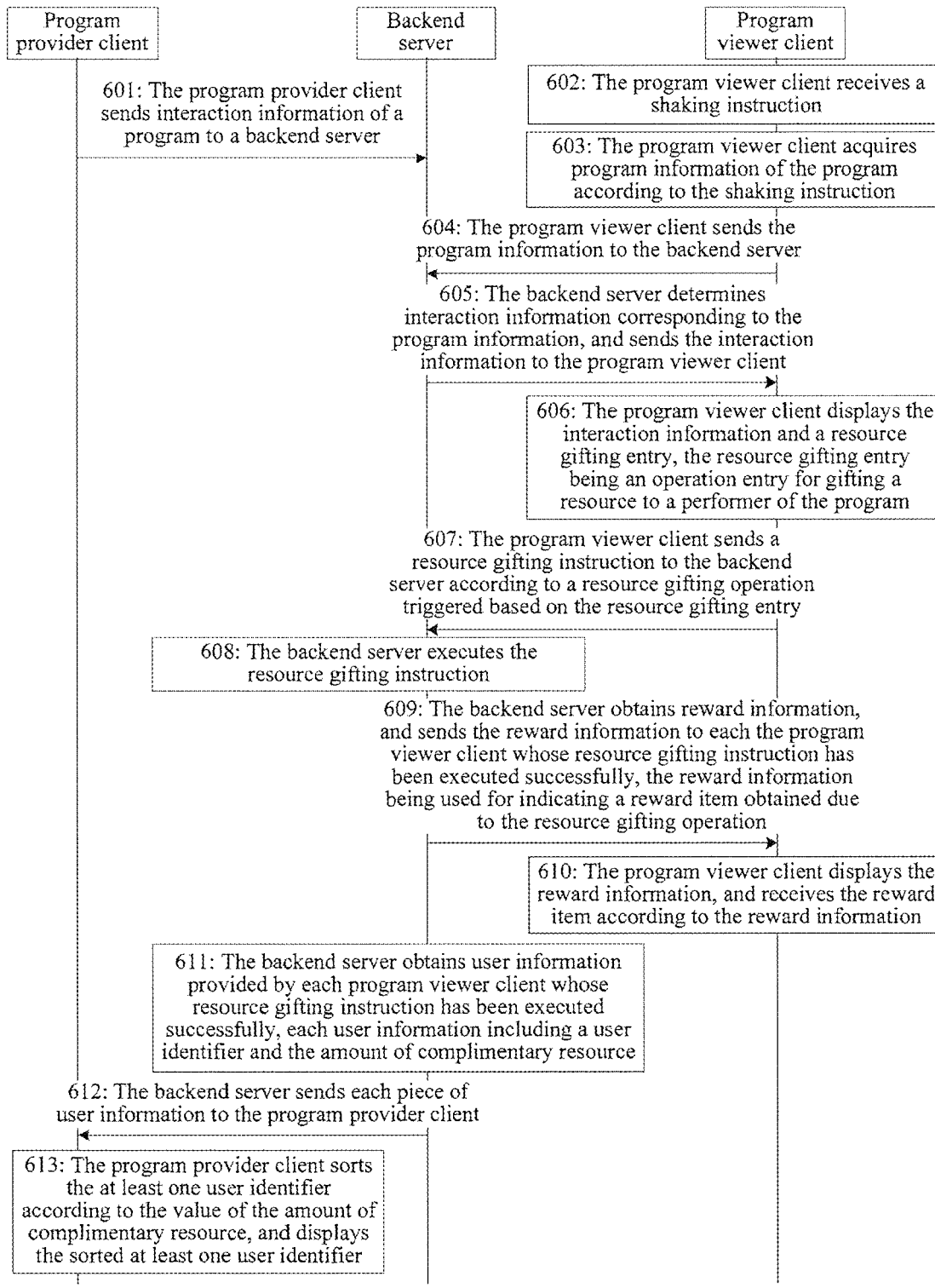
FIG. 6 is a method flowchart of a program interaction method according to an embodiment of this application.

Referring to FIG. 6, FIG. 6 is a method flowchart of a program interaction method according to another embodiment of this application. The program interaction method may be applied to the implementation environment shown in FIG. 1. The program interaction method includes the following steps:

Step 601: A program provider client sends interaction information of a program to a backend server.

The interaction information may include performer-related information and an interaction description of the program, and so on. For example, the interaction information includes a list of performers, a picture and a textual description of each performer, and so on, which are not limited in this embodiment.

According to the type of the program provided by the program provider, the program provider client may send the interaction information of the program to the backend server in two implementations. In the first implementation, the program is a recorded program, and the program provider client can send the program and the interaction information of the program to the backend server together. The recorded program may be a program that is recorded in advance and played, or may be a program that is live recorded and played. In the second implementation, the program is a live show, and the program provider client can send the interaction information of the program to the backend server.

In the first implementation, the program provider client obtains an audio stream of the program. When the program corresponds to only one piece of interaction information, the program provider client sends the audio stream and the interaction information to the backend server. When the program corresponds to multiple pieces of interaction information, the program provider client segments the audio stream, and sends each audio stream segment and a corresponding piece of interaction information to the backend server. Alternatively, the program provider client may further generate an interaction list including all interaction information, set a program time period corresponding to each piece of the interaction information, and send the audio stream as well as the interaction list to the backend server.

For example, program duration is 20 minutes, a period from the first minute to the tenth minute corresponds to a first piece of interaction information, and a period from the eleventh minute to the twentieth minute corresponds to a second piece of interaction information. In this case, the program provider client may send an audio stream of the program from the first minute to the tenth minute together with the first piece of interaction information, and an audio stream of the program from the eleventh minute to the twentieth minute together with the second piece of interaction information to the backend server. Alternatively, the program provider client may generate an interaction list that includes a first piece of interaction information and a second piece of interaction information, where the first piece of interaction information corresponds to a period of time from the first minute to the tenth minute and the second piece of interaction information corresponds to a period of time from the eleventh minute to the twentieth minute, and sends the interaction list together with the audio stream to the backend server.

In the second implementation, the program provider client sends a program application request carrying interaction information to the backend server. The backend server allocates a program identifier to the program according to the program application request, and sends the program identifier to the program provider client. The program provider client sends the program identifier to broadcasting equipment for broadcasting.

Specifically, the program provider client first applies for an account and a password from a predetermined platform in the backend server. After logging onto the predetermined platform in the backend server by using the account and the password, the program provider client applies for a program interaction service in the predetermined platform, and fills all interaction information, to generate an interaction list. Then, the program provider client generates a program application request carrying the interaction list, and sends the program application request to the backend server. The backend server creates an interaction service according to the program application request, generates a program identifier, and stores the program identifier, the interaction list and the interaction service correspondingly. Then, the backend server sends the program identifier to the program provider client. The program provider client sends the program identifier to broadcasting equipment. When the broadcasting equipment is Ibeacon equipment, the program identifier may be an IbeaconId.

When filling in the interaction information, the program provider may roughly divide the program into multiple periods of time, and fill in one piece of interaction information for each period of time. For example, it is estimated that the program duration is 20 minutes, a first piece of interaction information is filled in for the program from the first minute to the tenth minute, and a second piece of interaction information is filled in for the program from eleventh minute to the twentieth minute.

It should be noted that, multiple pieces of interaction information may correspond to different Uniform Resource Locators (URLs). Alternatively, multiple pieces of interaction information may also correspond to a same URL, and then interaction information in the URL is updated according to periods of time.

The program provider may set the interaction information when the program proceeds to an appropriate moment, so as to guide the program viewer to interact.

Step 602: The program viewer client receives a shaking instruction.

Figure 7:
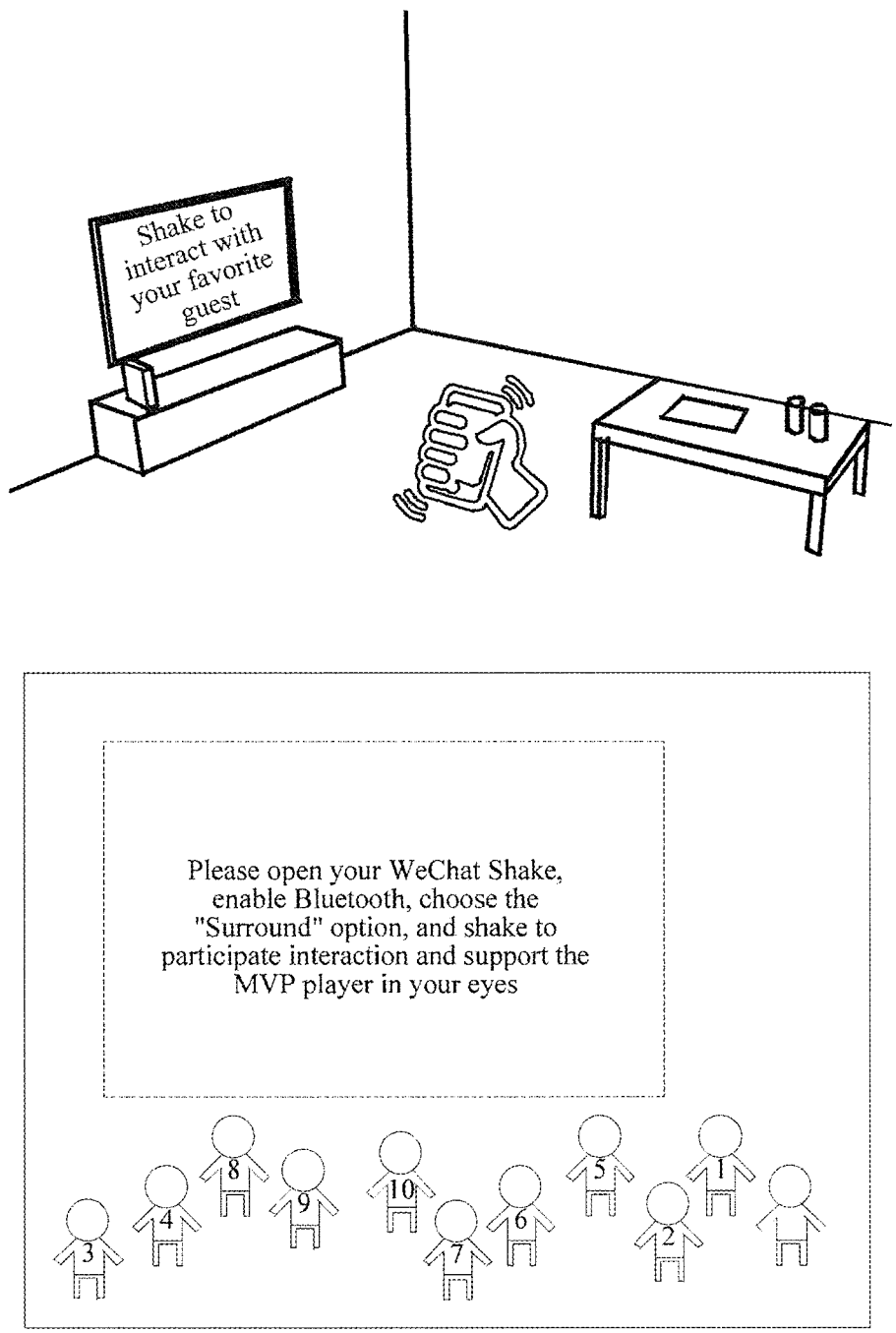
FIG. 7 is a schematic diagram of prompting shaking according to an embodiment of this application.

When the program is a recorded program, prompt information for shaking the program viewer client is displayed in a program playing interface. For example, prompt information "Shake to interact with your favorite guest" is displayed on a TV screen. When the program is a live show, the program provider prompts program viewers on site to shake their program viewer clients. For example, prompt information "Please open your WeChat Shake, enable Bluetooth, choose the "Surround" option, and shake to participate in interaction and support the MVP player in your eyes" is displayed on a large screen on site. Refer the schematic diagram of prompting shaking shown in FIG. 7, where the upper part of FIG. 7 is a schematic diagram of a prompt corresponding to a recorded program, and the lower part is a schematic diagram of a prompt corresponding to a live show.

When the program viewer shakes the program viewer client, the program viewer client receives a shaking instruction.

Step 603: The program viewer client acquires program information of the program according to the shaking instruction.

According to the type of the program provided by the program provider, the program provider client may acquire program information in two implementations. In the first implementation, the program is a recorded program, and the program viewer client acquires a voice signal in a current environment by using a microphone according to the shaking instruction, and uses the voice signal as the program information. In the second implementation, the program is a live show, and the program viewer client receives, according to the shaking instruction, a program identifier broadcasted by broadcasting equipment, and uses the program identifier as the program information.

Step 604: The program viewer client sends the program information to the backend server.

When the program information is a voice signal, the program viewer client processes the voice signal and sends the processed voice signal to the backend server. When the program information is a program identifier, the program viewer client sends the program identifier to the backend server.

Step 605: The backend server determines interaction information corresponding to the program information, and sends the interaction information to the program viewer client.

When the program information is a voice signal, the program viewer client compares the voice signal with each pre-stored audio stream to determine an audio stream including the voice signal, and then determines interaction information corresponding to the audio stream. Alternatively, the program viewer client compares the voice signal with each pre-stored audio stream segment to determine an audio stream segment including the voice signal, and then determines interaction information corresponding to the audio stream segment. Alternatively, the program viewer client compares the voice signal with each pre-stored audio stream to determine the audio stream including the voice signal, then determines an interaction list corresponding to the audio stream, and determines interaction information according to the interaction list. When the program information is a program identifier, the program viewer client determines an interaction list according to the program identifier, and determines interaction information according to the interaction list.

Specifically, the determining, by the backend server, interaction information corresponding to the program information includes: determining, by the backend server, an interaction list according to the program information, the interaction list including interaction information of the program in each period of time; and determining, by the backend server, a period of time to which a current moment belongs, and searching the interaction list for interaction information corresponding to the period of time.

Each piece of interaction information in the interaction list corresponds to a period of time. Therefore, after determining the interaction list, the backend server may obtain a current time point, determine a period of time to which the current time point belongs, and then search for interaction information according to the determined period of time. For example, the current time point is the seventh minute of the program, the first minute to the tenth minute corresponds to the first piece of interaction information, and the eleventh minute to the twentieth minute corresponds to the second piece of interaction information; in this case, the backend server determines that the seventh minute belongs to the period of time from the first minute to the tenth minute, and finds the first piece of interaction information.

After fining the interaction information, the backend server sends the interaction information to the program viewer client.

Step 606: The program viewer client displays the interaction information and a resource gifting entry, the resource gifting entry being an operation entry for gifting a resource to a performer of the program.

Generally speaking, the resource gifting entry in this embodiment of this application is a reward entry. A user can trigger, by using the reward entry, an operation of rewarding a performer. The resource gifted by the program viewer to the performer by means of the resource gifting entry may be a cash resource or a virtual resource. The virtual resource may be flowers, likes, credits, ingots, and so on.

The interaction information not only can include the performer-related information and the interaction description, but also can include a support status of other program viewers with respect to the performer. For example, the interaction information may further include the number of rewarding times, reward amounts, reward ranking, and so on of other program viewers with respect to the performer, which are not limited in this embodiment.

Figure 8:
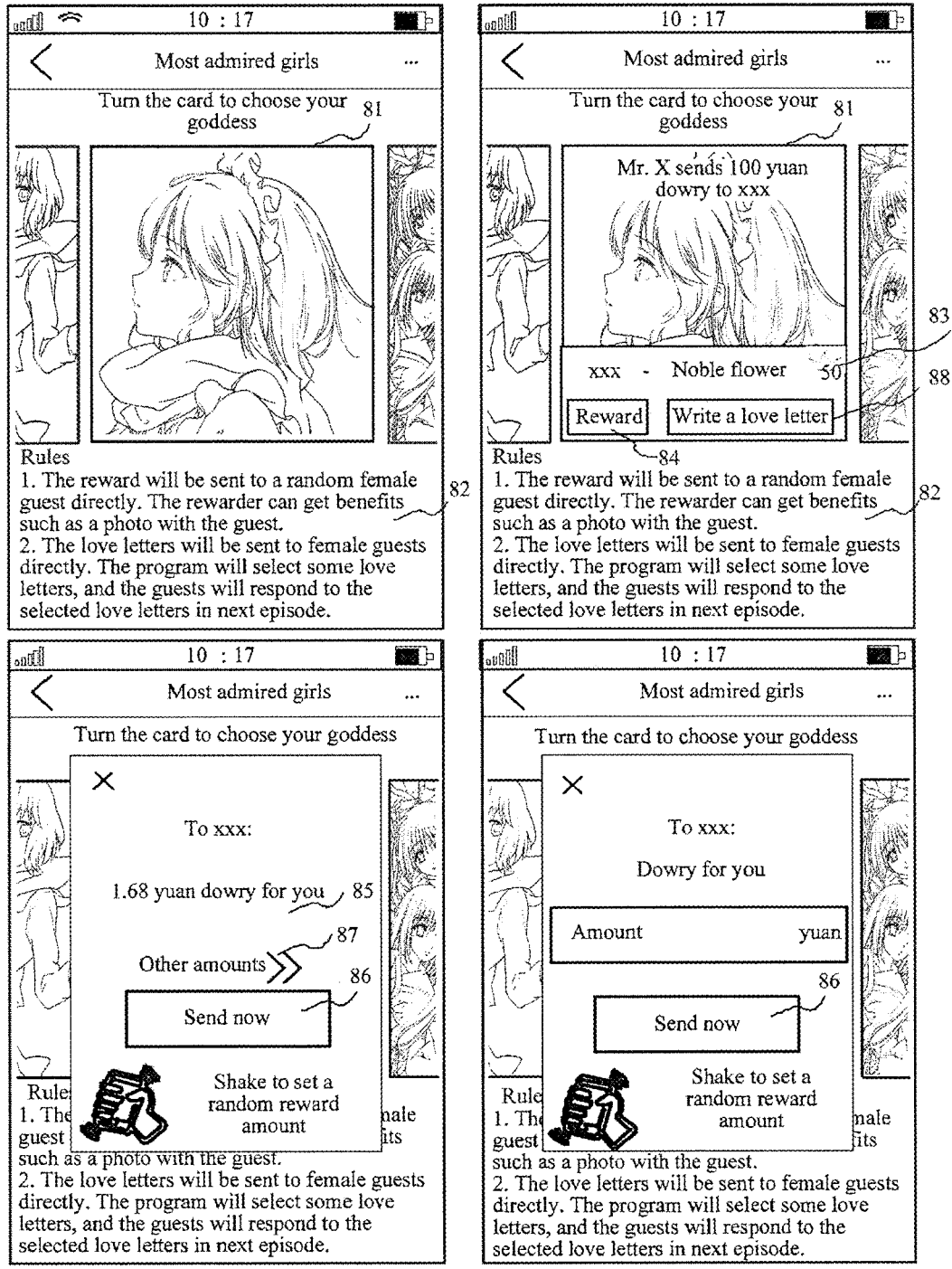
FIG. 8 is a schematic diagram of interaction information and a resource gifting entry according to an embodiment of this application.

Refer to FIG. 8, which is a schematic diagram of interaction information and a resource gifting entry. When the interaction information includes performer information, an interaction description, and a support status, FIG. 8 shows pictures 81 of three performers and an interaction description 82. When a program viewer wants to gift a resource to the performer in the center, the program viewer may click the picture 81 of the performer to select the performer. In this case, the program viewer client obtains a support status 83 of the performer from the backend server, and displays the support status 83 and a resource gifting entry 84.

Step 607: The program viewer client sends a resource gifting instruction to the backend server according to a resource gifting operation triggered based on the resource gifting entry.

When wanting to gift a resource to a performer, the program viewer may trigger a resource gifting operation based on the resource gifting entry. After displaying the interaction information and the resource gifting entry, the program viewer client may further determine the amount of complimentary resource randomly, and display the amount; or display an input field for the amount of complimentary resource. The complimentary resource disclosed herein is a resource that is transferred to a performer of the program for a reward.

In the first implementation, the amount of complimentary resource is determined randomly. When setting the amount, the program provider may further configure an interesting textual description for the amount, to meet the emotion of the program viewer by means of the textual description, thereby satisfying an affection need of the program viewer and motivating the program viewer to gift a resource. For example, when the amount is 1.68, the textual description may be "To xxx: dowry for you".

When not satisfied with the currently determined amount, the program viewer may further shake the program viewer client, and the program viewer client replaces the current amount with another randomly determined amount. By shaking the program viewer client to change the amount, the program viewer can spend less time on thinking and operation, thus completing the resource gifting operation as quickly as possible and mainly focusing on the program.

In the second implementation, the amount of complimentary resource is input by the program viewer manually. In this case, the program viewer client may display an input field for the amount of complimentary resource, and the program viewer inputs the amount of complimentary resource in the input field.

For example, in FIG. 8, when the program viewer clicks the resource gifting entry 84, the program viewer client displays a resource gifting interface, and complimentary resource amount 85 is displayed in the interface. The program viewer may click a control 86 to gift a resource. Alternatively, the program viewer may click a link 87 so that an input field for resource gifting is displayed. The program viewer inputs an amount in the input field, and then clicks the control 86 to gift the resource.

The resource gifting instruction generated according to the resource gifting operation may include: a user identifier of the program viewer client, the amount of complimentary resource, and a performer identifier.

In addition to gifting a resource to the performer, the program viewer may further send a text-image message to the performer, to express love. For example, a "write a love letter" input entry 88 is shown in FIG. 8.

Step 608: The backend server executes the resource gifting instruction.

When the complimentary resource is a cash resource, the backend server sends the complimentary resource indicated by the resource gifting instruction from an account corresponding to the program viewer client to an account corresponding to the program provider client. In a possible implementation, the backend server first transfers the complimentary resource indicated by the resource gifting instruction from the account corresponding to the program viewer client to an intermediate account provided by the backend server, and then transfers the complimentary resource from the intermediate account to the account corresponding to the program provider client. The backend server may transfer the complimentary resource from the intermediate account to the account corresponding to the program provider client on a regular basis, or may transfer the complimentary resource from the intermediate account to the account corresponding to the program provider client in real time.

When the complimentary resource is a virtual resource, the backend server adds the amount of complimentary resource corresponding to the current resource gifting operation to the amount of complimentary resource already obtained by the program provider.

In this embodiment, after the program viewer gifts the resource to the performer, a reward item may be sent to the program viewer, to motivate the program viewer to gift more resources. The reward item may be a material reward. For example, the reward is a coupon, an exclusive video or audio of the performer, or the like. In this case, steps 609 and 610 are performed. The reward item may also be a spiritual reward. For example, information of resources gifted by program viewers is displayed on a rank, to meet a show-off requirement of the program viewers. In this case, steps 611 to 613 are performed.

Step 609: The backend server obtains reward information, and sends reward information to each program viewer client whose resource gifting instruction has been executed successfully, the reward information being used for indicating a reward item obtained due to the resource gifting operation.

The resource gifting instruction carries the user identifier of the program viewer client. Therefore, after executing the resource gifting instruction, the backend server may determine, according to the user identifier, the program viewer client whose resource gifting instruction has been executed successfully. The backend server then determines a reward item, generates reward information, and sends the reward information to the program viewer client.

The backend server may determine the reward item randomly. Alternatively, the backend server may determine the reward item according to the value of the amount of complimentary resource. For example, the reward item includes a postcard, an exclusive audio of the performer, and an exclusive video of the performer. If the amount of resource is 1, it is determined that the reward item is the exclusive audio of the performer. If the amount of resource is 10, it is determined that the reward item is the exclusive video of the performer. If the amount of resource is 100, it is determined that the reward item is the postcard.

Step 610: The program viewer client displays the reward information, and receives the reward item according to the reward information.

When the reward item is a material reward and is a physical object, the reward information may include an input field for an address of the program viewer. The program viewer client obtains the address of the program viewer, and sends the address to the backend server. The backend server sends the address to the program provider client, and the program provider mails the physical object to the program viewer.

When the reward item is a material reward and is a virtual object, the reward information may include a receiving entry for the virtual object. The program viewer client triggers the receiving entry, and sends a receiving instruction to the backend server. The backend server sends the coupon to the program viewer client.

The program provider may further simulate an actual releasing process of the reward item to generate a simulated page, and displays the reward information on the simulated page, so that the program viewer can think of the actual releasing process of the reward according to the simulated page, improving user experience.

Figure 9:
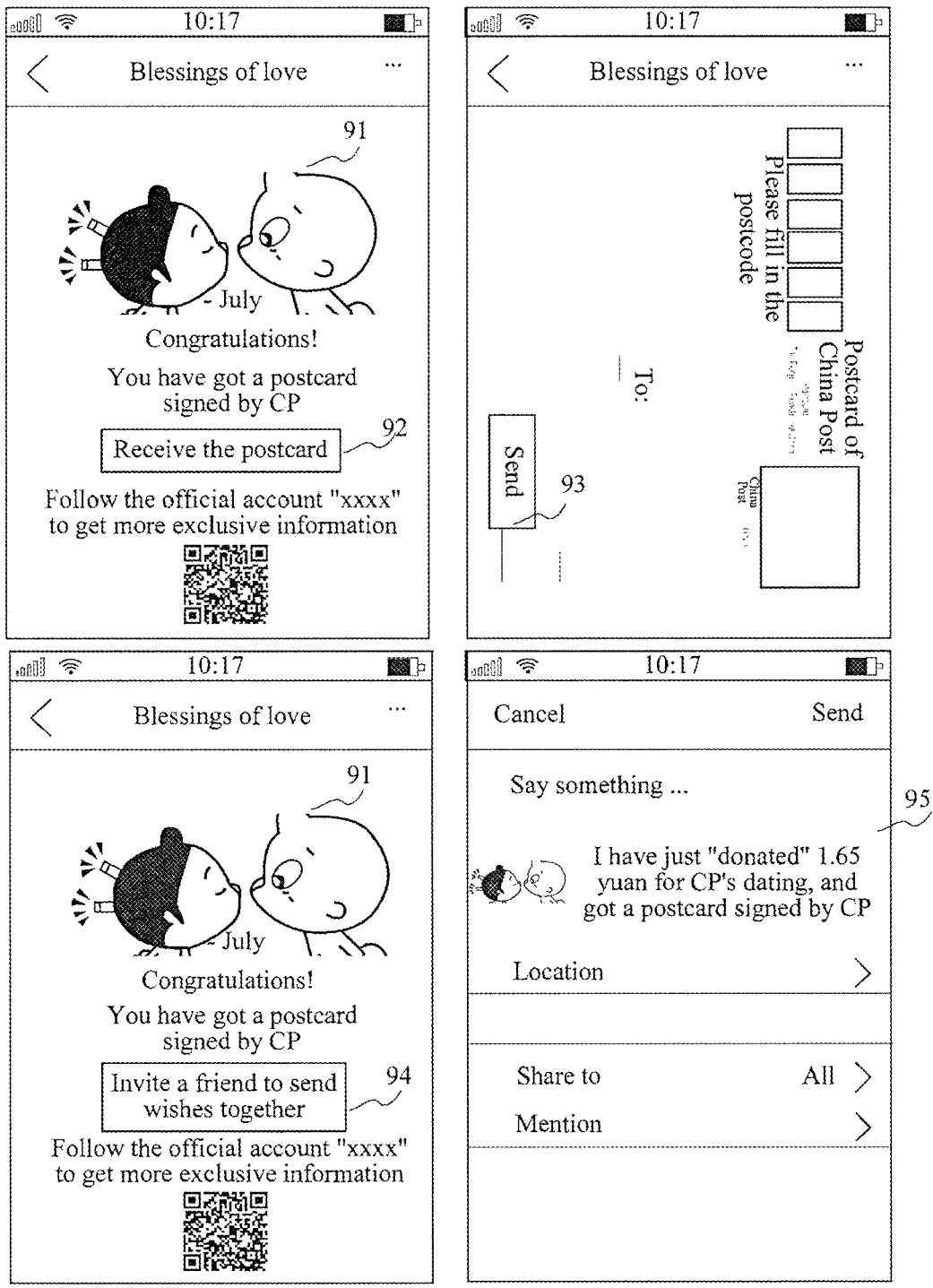
FIG. 9 is a schematic diagram of receiving a postcard according to an embodiment of this application.

For example, referring to a schematic diagram of receiving a postcard shown in FIG. 9, postcard information 91 and a receiving entry 92 are shown in FIG. 9. When the program viewer clicks the postcard information 91 to check the postcard, the program viewer client displays the postcard in a full screen mode. When the program viewer clicks the receiving entry 92, the program viewer client displays a postcard-pattern address obtaining page. The program viewer inputs an address on the address obtaining page, and triggers a sending control 93. The program viewer client sends the address to the backend server. Further, the program viewer client may further display a sharing control 94. When the program viewer clicks the sharing control 94, the program viewer client displays a sharing page 95.

Figure 10:
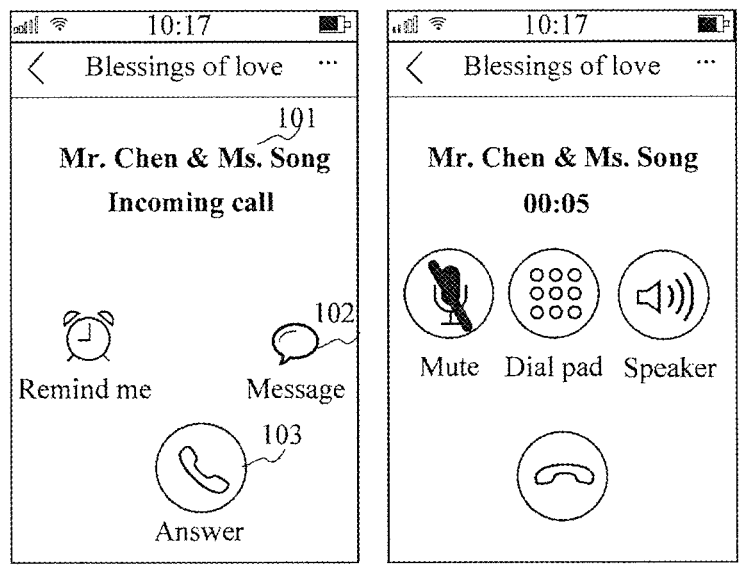
FIG. 10 is a schematic diagram of receiving an exclusive audio according to an embodiment of this application.

For example, referring to the schematic diagram of receiving an exclusive audio shown in FIG. 10, a simulated incoming call interface 101 is generated based on an exclusive audio in FIG. 10, and a performer name 102 and an answering control 103 are shown in the incoming call interface 101. When the program viewer clicks the answering control 103, the program viewer client plays the exclusive audio. As shown in FIG. 9, the program viewer may also share the reward and invite a friend to gift a resource, to expand the propagation range, and no further examples are shown in FIG. 10.

Step 611: The backend server obtains user information provided by each program viewer client whose resource gifting instruction has been executed successfully, each piece of user information including a user identifier and the amount of complimentary resource.

The resource gifting instruction carries the user identifier of the program viewer client and the amount of complimentary resource. Therefore, after executing the resource gifting instruction, the backend server will determine, according to the user identifier, the program viewer client whose resource gifting instruction has been executed successfully.

Step 612: The backend server sends each piece of user information to the program provider client.

Step 613: The program provider client sorts at least one user identifier according to the value of the amount of complimentary resource, and displays the sorted at least one user identifier.

The program provider client may sort the at least one user identifier according to the value of the amount of complimentary resource, and add the sorted at least one user identifier to the interaction information, so that each program viewer client displays the user identifier, to motivate program viewers to gift resources. When the amount of complimentary resource of a particular program viewer is relatively large, the program provider client may further add the user identifier of the program viewer to the interaction information.

When the program is a recorded program, the program provider cannot modify the interaction information conveniently. Therefore, the program provider may further invite a performer to stay in another platform, sort the at least one user identifier according to the value of the amount of complimentary resource in the another platform in real time, and then display the sorted at least one user identifier, or display, in the another platform, a user identifier of a program viewer who gifts a large amount of resource.

When the program is a live show, the program provider may further ask a program viewer to the stage to participate in the program, to stimulate the emotion of the program viewer so that the program viewer further gifts a resource to the performer.

Steps 601 and 613 may be independently implemented as an embodiment on the program provider client side. Steps 605, 608, 609, 611 and 612 may be independently implemented as an embodiment on the backend server side. Steps 602, 603, 604, 606, 607 and 610 may be independently implemented as an embodiment on the program viewer client side.

In conclusion, according to the program interaction method provided in this embodiment of this application, program information is sent to a backend server, and then interaction information and a resource gifting entry that correspond to the program information can be obtained, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The method makes it more efficient and convenient to participate in an interaction activity.

Reward information is sent to each program viewer client whose resource gifting instruction has been executed successfully, and a reward item can be sent to the program viewer, to motivate the program viewer to gift a resource.

The at least one user identifier is sorted according to the value of the amount of complimentary resource and then displayed, which can meet a show-off requirement of the program viewer, thereby motivating the program viewer to gift a resource.

The amount of complimentary resource is determined randomly, so that the program viewer spends less time on thinking and operation, thus completing the resource gifting operation as quickly as possible and mainly focusing on the program.

A shaking instruction is received; program information of the program is acquired according to the shaking instruction; and the program information is sent to the backend server, so that the program viewer can gift a resource to the performer of the program by using only a simple operation, making it more efficient and convenient to participate in the interaction activity.

Figure 11:
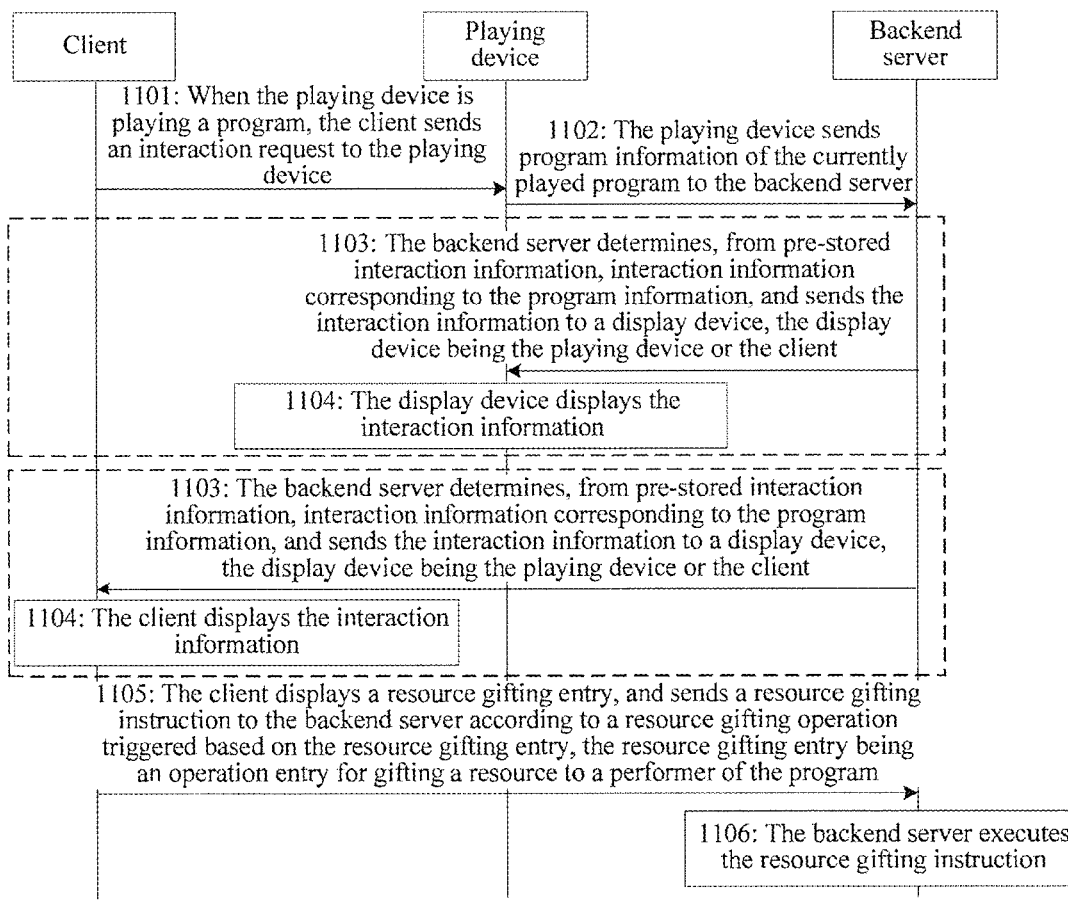
FIG. 11 is a method flowchart of a program interaction method according to an embodiment of this application.

Referring to FIG. 11, FIG. 11 is a method flowchart of a program interaction method according to an embodiment of this application. The program interaction method may be applied to the implementation environment shown in FIG. 2. The program interaction method includes the following steps:

Step 1101: When a playing device is playing a program, a client sends an interaction request to the playing device.

Step 1102: The playing device sends program information of the currently played program to a backend server.

Step 1103: The backend server determines, from pre-stored interaction information, interaction information corresponding to the program information, and sends the interaction information to a display device, the display device being the playing device or the client.

Step 1104: The display device displays the interaction information.

Step 1105: The client displays a resource gifting entry, and sends a resource gifting instruction to the backend server according to a resource gifting operation triggered based on the resource gifting entry, the resource gifting entry being an operation entry for gifting a resource to a performer of the program.

Step 1106: The backend server executes the resource gifting instruction.

In conclusion, according to the program interaction method provided in this embodiment of this application, program information is sent to a backend server, and then interaction information and a resource gifting entry that correspond to the program information can be obtained, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The method makes it more efficient and convenient to participate in an interaction activity.

Figure 12:
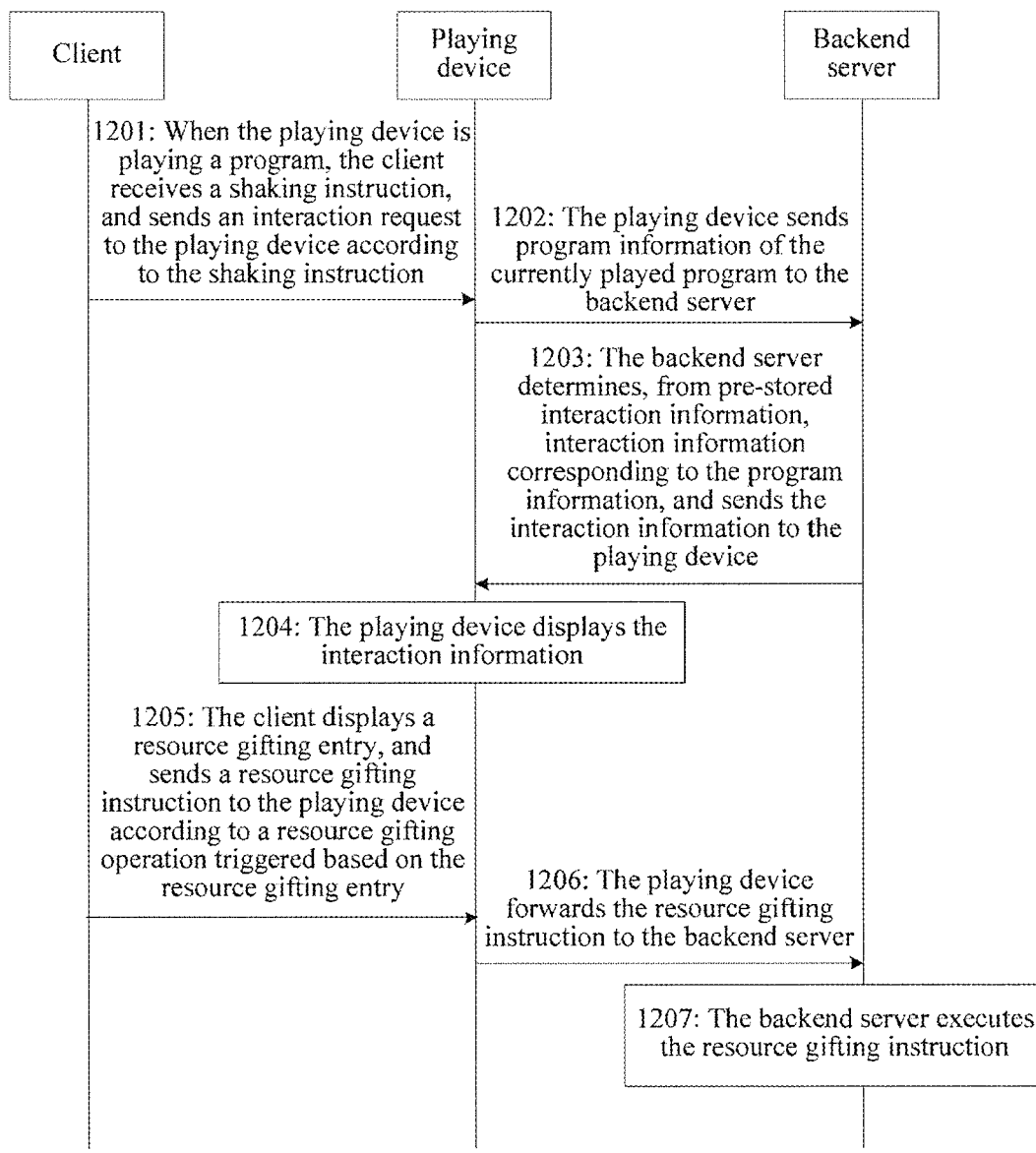
FIG. 12 is a method flowchart of a program interaction method according to an embodiment of this application.

Referring to FIG. 12, FIG. 12 is a method flowchart of a program interaction method according to another embodiment of this application. The program interaction method may be applied to the implementation environment shown in FIG. 2, and the display device is the playing device. The program interaction method includes the following steps:

Step 1201: When a playing device is playing a program, a client receives a shaking instruction, and sends an interaction request to the playing device according to the shaking instruction.

In an implementation scenario, the playing device and the client access a same local area network. When a program viewer is watching a program played by the playing device, the playing device may display client shaking prompt information in a playing interface of the program, for example, as shown in the upper part of FIG. 7. In this case, the program viewer may shake the client according to the prompt of the playing device. The client receives the shaking instruction and sends, in the local area network, an interaction request to the playing device according to the shaking instruction.

The interaction request carries a user identifier of the program viewer and is used for requesting interaction information of the program. The interaction information may include performer-related information and an interaction description of the program, and so on. For example, the interaction information includes a list of performers, a picture and a textual description of each performer, and so on, which are not limited in this embodiment.

Step 1202: The playing device sends program information of the currently played program to the backend server.

Specifically, the sending, by the playing device, program information of the currently played program to the backend server includes: sending, by the playing device, a program identifier of the program to the backend server; or obtaining, by the playing device, original data corresponding to a currently played image frame, and sending the original data to the backend server; or obtaining, by the playing device, original data corresponding to a currently played image frame, decoding the original data, and sending decoded data to the backend server.

Step 1203: The backend server determines, from pre-stored interaction information, interaction information corresponding to the program information, and sends the interaction information to the playing device.

When the program information sent by the playing device is a program identifier, the backend server pre-stores a correspondence between program identifiers and interaction information. When the program identifier corresponds to only one piece of interaction information, the backend server directly sends the interaction information to the playing device; when the program identifier corresponds to an interaction list, because each piece of interaction information in the interaction list corresponds to a period of time, the backend server may obtain a current time point after determining the interaction list, determine a period of time to which the current time point belongs, then search for interaction information according to the determined period of time, and send the found interaction information to the playing device.

When the program information sent by the playing device is original data of a currently played image frame, the backend server pre-stores a correspondence between audio streams of programs and interaction information. The backend server decodes the original data, and compares the decoded data with each pre-stored audio stream to determine an audio stream including the data, and then determines interaction information corresponding to the audio stream. When the audio stream corresponds to only one piece of interaction information, the backend server directly sends the interaction information to the playing device. When the audio stream corresponds to an interaction list, because each piece of interaction information in the interaction list corresponds to a period of time, the backend server may obtain a current time point after determining the interaction list, determine a period of time to which the current time point belongs, then search for interaction information according to the determined period of time, and send the found interaction information to the playing device.

When the program information sent by the playing device is data obtained after the original data is decoded, the backend server pre-stores a correspondence between audio streams of programs and interaction information. The backend server directly compares the data with each pre-stored audio stream to determine an audio stream including the data, and then determines interaction information corresponding to the audio stream. Refer to the foregoing description for a specific process of determining, by the backend server, the interaction information according to the audio stream. Details are not described herein again.

Step 1204: The playing device displays the interaction information.

The playing device may display the interaction information in the middle of a screen, to highlight the display effect of the interaction information. Alternatively, the playing device may also display the interaction information at the edge of the screen, to avoid disturbing the program viewer watching the program.

Step 1205: The client displays a resource gifting entry, and sends a resource gifting instruction to the playing device according to a resource gifting operation triggered based on the resource gifting entry.

When the interaction information includes related information of one performer, the playing device triggers the client to display a resource gifting entry. The client sends a resource gifting instruction to the playing device according to a resource gifting operation triggered based on the resource gifting entry. When the interaction information includes a performer list, the client sends, to the playing device, an instruction of selecting one performer from the performer list. The playing device triggers, according to the performer, the client to display a resource gifting entry. The client sends a resource gifting instruction to the playing device according to a resource gifting operation triggered based on the resource gifting entry. Alternatively, when the interaction information includes a performer list, the playing device triggers the client to display a resource gifting entry. The client selects a performer from the performer list, and sends a resource gifting instruction to the playing device according to a resource gifting operation triggered based on the resource gifting entry. In this case, the resource gifting instruction further includes a performer identifier.

Refer to the description in step 607 for a specific process of sending, by the client, a resource gifting instruction to the playing device according to a resource gifting operation triggered based on the resource gifting entry. Details are not described herein again.

Step 1206: The playing device forwards the resource gifting instruction to the backend server.

Step 1207: The backend server executes the resource gifting instruction.

An implementation process of steps 1206 to 1207 are the same as an implementation process of steps 607 to 608. Details are not described herein again.

The client may also send the resource gifting instruction to the backend server directly, which is not limited in this embodiment.

After executing the resource gifting instruction successfully, the backend server may further generate reward information and send the reward information to the playing device, and the playing device forwards the reward information to the client, so that the client receives a reward item. Alternatively, the backend server may further send user information provided by each client whose resource gifting instruction has been executed successfully to the playing device, each piece of user information including a user identifier and the amount of complimentary resource. The playing device sorts the at least one user identifier according to the value of the amount of complimentary resource, and displays the sorted at least one user identifier. Refer to the description in the embodiment shown in FIG. 6 for a specific implementation process. Details are not described herein again.

Steps 1202, 1204 and 1206 may be independently implemented as an embodiment on the playing device side. Steps 1203 and 1207 may be independently implemented as an embodiment on the backend server side. Steps 1201 and 1205 may be independently implemented as an embodiment on the client side.

In conclusion, according to the program interaction method provided in this embodiment of this application, program information is sent to a backend server, and then interaction information and a resource gifting entry that correspond to the program information can be obtained, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The method makes it more efficient and convenient to participate in an interaction activity.

A shaking instruction is received; an interaction request is sent to the playing device according to the shaking instruction, so that the program viewer can initiate interaction by using only a simple operation, making it more efficient and convenient to participate in the interaction activity.

Figure 13:
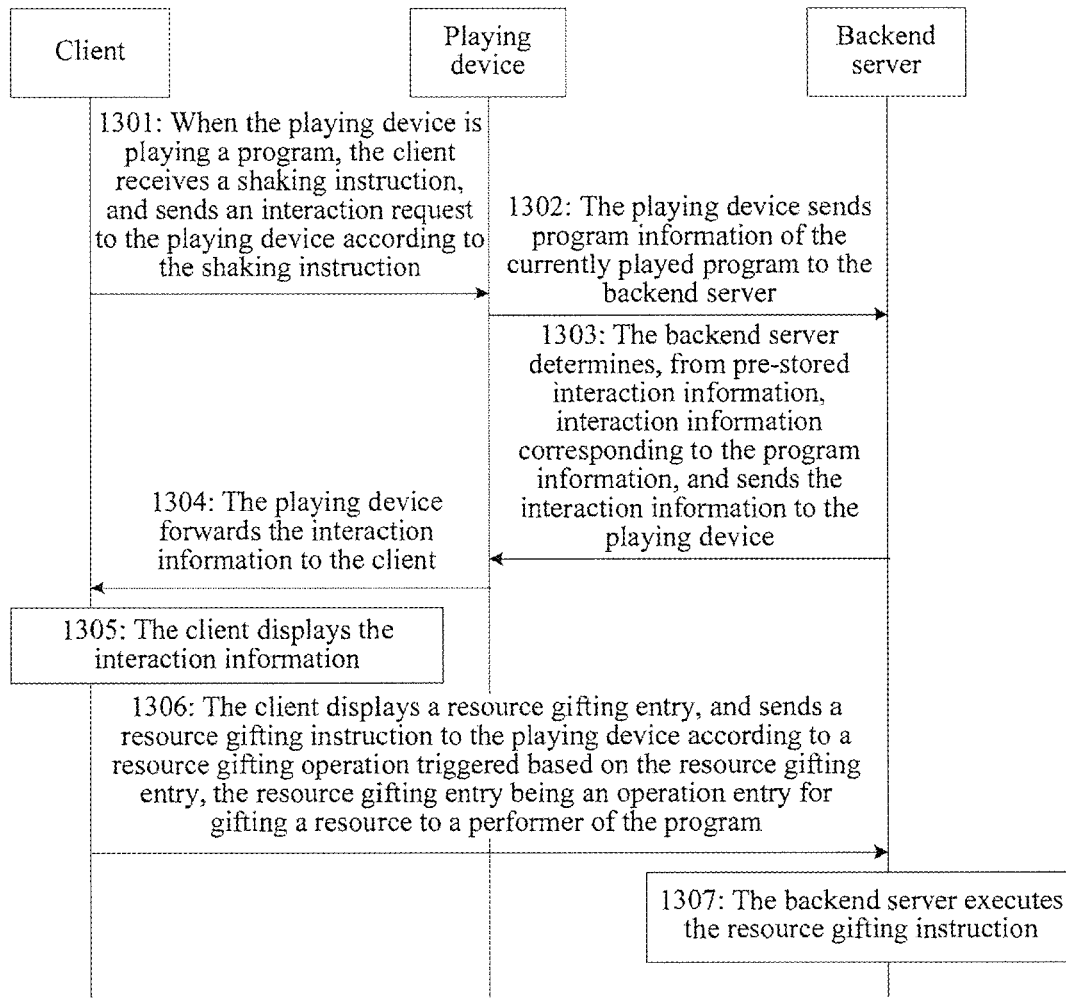
FIG. 13 is a method flowchart of a program interaction method according to an embodiment of this application.

Referring to FIG. 13, FIG. 13 is a method flowchart of a program interaction method according to another embodiment of this application. The program interaction method may be applied to the implementation environment shown in FIG. 2, and the display device is the client. The program interaction method includes the following steps:

Step 1301: When a playing device is playing a program, a client receives a shaking instruction, and sends an interaction request to the playing device according to the shaking instruction.

Refer to the description in step 1201 for a specific implementation process of step 1301. Details are not described herein again.

Step 1302: The playing device sends program information of the currently played program to a backend server.

Specifically, the sending, by the playing device, program information of the currently played program to the backend server includes: sending, by the playing device, a program identifier of the program to the backend server, or obtaining, by the playing device, original data corresponding to a currently played image frame, and sending the original data to the backend server; or obtaining, by the playing device, original data corresponding to a currently played image frame, decoding the original data, and sending decoded data to the backend server.

Step 1303: The backend server determines, from pre-stored interaction information, interaction information corresponding to the program information, and sends the interaction information to the playing device.

Refer to the description in step 1203 for a specific implementation process of determining the interaction information by the backend server. Details are not described herein again.

Step 1304: The playing device forwards the interaction information to the client.

Step 1305: The client displays the interaction information.

Step 1306: The client displays a resource gifting entry, and sends a resource gifting instruction to the playing device according to a resource gifting operation triggered based on the resource gifting entry, the resource gifting entry being an operation entry for gifting a resource to a performer of the program.

The client may also send the resource gifting instruction to the playing device, and the playing device forwards the resource gifting instruction to the backend server, which is not limited in this embodiment.

Step 1307: The backend server executes the resource gifting instruction.

An implementation process of steps 1305 to 1307 are the same as an implementation process of steps 606 to 608. Details are not described herein again.

After executing the resource gifting instruction successfully, the backend server may further generate reward information and send the reward information to the playing device, and the playing device forwards the reward information to the client, so that the client receives a reward item. Alternatively, the backend server may further send user information provided by each client whose resource gifting instruction has been executed successfully to the playing device, each piece of user information including a user identifier and the amount of complimentary resource. The playing device sorts the at least one user identifier according to the value of the amount of complimentary resource, and displays the sorted at least one user identifier. Refer to the description in the embodiment shown in FIG. 6 for a specific implementation process. Details are not described herein again.

Steps 1302 and 1304 may be independently implemented as an embodiment on the playing device side. Steps 1303 and 1307 may be independently implemented as an embodiment on the backend server side. Steps 1301, 1305 and 1306 may be independently implemented as an embodiment on the client side.

In conclusion, according to the program interaction method provided in this embodiment of this application, program information is sent to a backend server, and then interaction information and a resource gifting entry that correspond to the program information can be obtained, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The method makes it more efficient and convenient to participate in an interaction activity.

A shaking instruction is received; an interaction request is sent to the playing device according to the shaking instruction, so that the program viewer can initiate interaction by using only a simple operation, making it more efficient and convenient to participate in the interaction activity.

Figure 14:
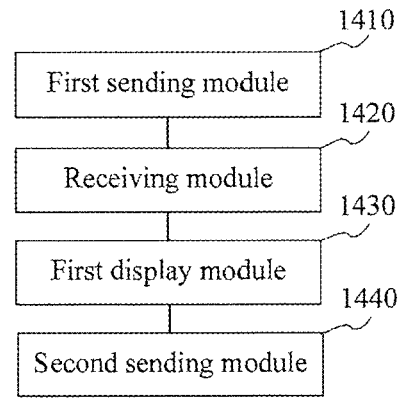
FIG. 14 is a structural block diagram of a client (or client device) according to an embodiment of this application.

Referring to FIG. 14, FIG. 14 is a structural block diagram of a client according to an embodiment of this application. The client includes:

a first sending module 1410, configured to send program information of a currently watched program to a backend server;

a receiving module 1420, configured to receive interaction information sent by the backend server, the interaction information corresponding to the program information sent by the first sending module 1410;

a first display module 1430, configured to display the interaction information and a resource gifting entry, the resource gifting entry being an operation entry for gifting a resource to a performer of the program; and a second sending module 1440, send a resource gifting instruction to the backend server according to a resource gifting operation triggered based on the resource gifting entry, the backend server being configured to execute the resource gifting instruction.

In conclusion, the client provided in this embodiment of this application sends program information to a backend server, and then can obtain interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The client makes it more efficient and convenient to participate in an interaction activity.

Figure 15:
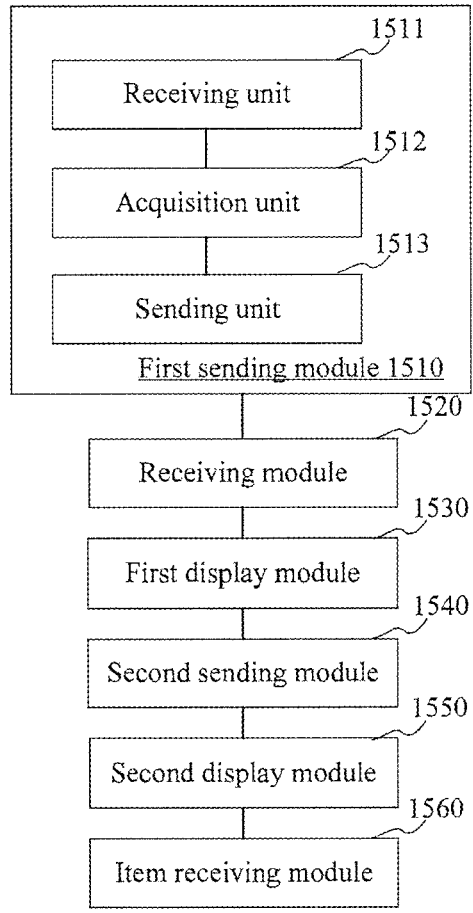
FIG. 15 is a structural block diagram of a client according to another embodiment of this application.

Referring to FIG. 15, FIG. 15 is a structural block diagram of a client according to another embodiment of this application. The client includes:

a first sending module 1510, configured to send program information of a currently watched program to a backend server;

a receiving module 1520, configured to receive interaction information sent by the backend server, the interaction information corresponding to the program information sent by the first sending module 1510;

a first display module 1530, configured to display the interaction information and a resource gifting entry, the resource gifting entry being an operation entry for gifting a resource to a performer of the program;

a second sending module 1540, configured to send a resource gifting instruction to the backend server according to a resource gifting operation triggered based on the resource gifting entry, the backend server being configured to execute the resource gifting instruction.

The client further includes:

a second display module 1550, configured to: after the second sending module 1540 sends the resource gifting instruction to the backend server according to the resource gifting operation triggered based on the resource gifting entry, display reward information sent by the backend server, the reward information being sent by the backend server to each client whose resource gifting instruction has been executed successfully, and the reward information being used for indicating a reward item obtained due to the resource gifting operation; and an item receiving module 1560, configured to receive the reward item according to the reward information displayed by the second display module 1550.

The first display module 1530 is further configured to:

after displaying the interaction information and the resource gifting entry, determine the amount of complimentary resource randomly, and display the amount; or display an input field for the amount of complimentary resource.

The first sending module 1510 includes:

a receiving unit 1511, configured to receive a shaking instruction;

an acquisition unit 1512, configured to acquire program information of a program according to the shaking instruction received by the receiving unit 1511; and a sending unit 1513, configured to send the program information obtained by the acquisition unit 1512 to the backend server.

The acquisition unit 1512 is specifically configured to:

acquire a voice signal in a current environment by using a microphone according to the shaking instruction, and use the voice signal as the program information; or receive, according to the shaking instruction, a program identifier broadcasted by broadcasting equipment, and use the program identifier as the program information.

In conclusion, the client provided in this embodiment of this application sends program information to a backend server, and then can obtain interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The client makes it more efficient and convenient to participate in an interaction activity.

Reward information is sent to each client whose has been executed successfully, so that a reward item can be sent to a user of the client, to motivate the user of the client to gift resources.

The amount of complimentary resource is determined randomly, so that the user of the client spends less time on thinking and operation, thus completing the resource gifting operation as quickly as possible and mainly focusing on the program.

A shaking instruction is received; program information of the program is acquired according to the shaking instruction; and the program information is sent to the backend server, so that the user of the client can gift a resource to the performer of the program by using only a simple operation, making it more efficient and convenient to participate in the interaction activity.

Figure 16:
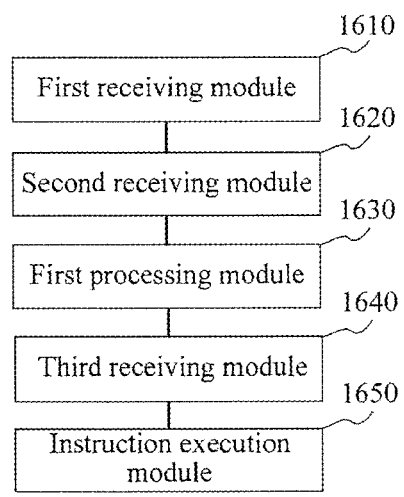
FIG. 16 is a structural block diagram of a backend server according to an embodiment of this application.

Referring to FIG. 16, FIG. 16 is a structural block diagram of a backend server according to an embodiment of this application. The backend server includes:

a first receiving module 1610, configured to receive interaction information of a program sent by a program provider client;

a second receiving module 1620, configured to receive program information of a currently watched program sent by a program viewer client;

a first processing module 1630, configured to determine interaction information corresponding to the program information received by the second receiving module 1620, and send the interaction information to the program viewer client;

a third receiving module 1640, configured to receive a resource gifting instruction sent by the program viewer client after the program viewer client displays the interaction information and a resource gifting entry, the resource gifting instruction being sent according to a resource gifting operation triggered based on the resource gifting entry; and an instruction execution module 1650, configured to execute the resource gifting instruction received by the third receiving module 1640.

In conclusion, the backend server provided in this embodiment of this application receives program information sent by a program viewer client, and then can provide interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The backend server makes it more efficient and convenient to participate in an interaction activity.

Figure 17:
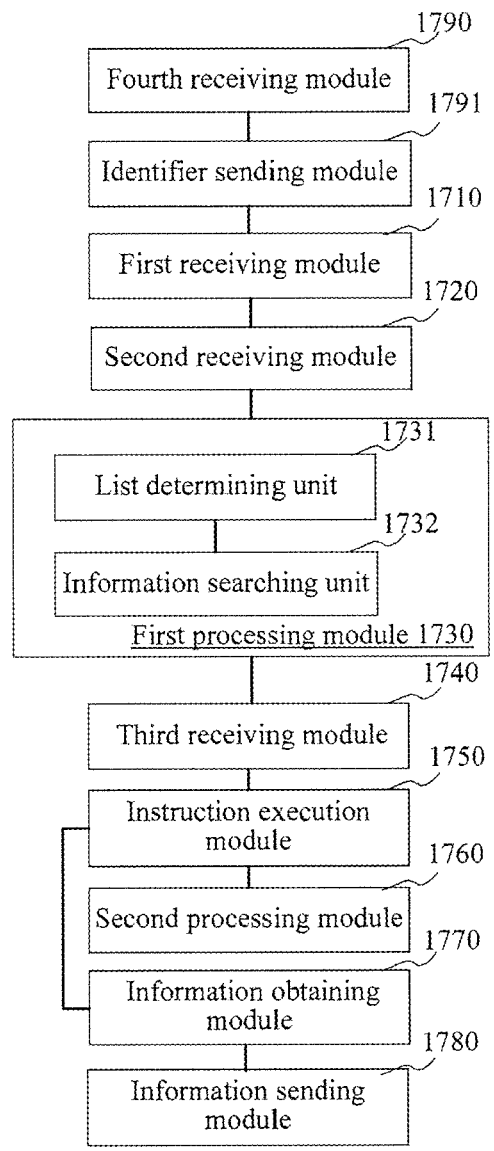
FIG. 17 is a structural block diagram of a backend server according to another embodiment of this application.

Referring to FIG. 17, FIG. 17 is a structural block diagram of a backend server according to another embodiment of this application. The backend server includes:

a first receiving module 1710, configured to receive interaction information of a program sent by a program provider client;

a second receiving module 1720, configured to receive program information of a currently watched program sent by a program viewer client;

a first processing module 1730, configured to determine interaction information corresponding to the program information received by the second receiving module 1720, and send the interaction information to the program viewer client;

a third receiving module 1740, configured to receive a resource gifting instruction sent by the program viewer client after the program viewer client displays the interaction information and a resource gifting entry, the resource gifting instruction being sent according to a resource gifting operation triggered based on the resource gifting entry; and an instruction execution module 1750, configured to execute the resource gifting instruction received by the third receiving module 1740.

The backend server is further configured to:

a second processing module 1760, configured to: after the instruction execution module 1750 executes the resource gifting instruction, obtain reward information, and send the reward information to each program viewer client whose resource gifting instruction has been executed successfully, the reward information being used for indicating a reward item obtained due to the resource gifting operation, and the program viewer client being configured to display the reward information and receive the reward item according to the reward information.

The backend server further includes:

an information obtaining module 1770, configured to: after the instruction execution module 1750 executes the resource gifting instruction, obtain user information provided by each program viewer client whose resource gifting instruction has been executed successfully, each piece of user information including a user identifier and the amount of complimentary resource; and an information sending module 1780, configured to send each piece of the user information obtained by the information obtaining module 1770 to the program provider client, the program provider client being configured to sort the at least one user identifier according to the value of the amount of complimentary resource, and display the sorted at least one user identifier.

The instruction execution module 1750 is specifically configured to:

transfer the complimentary resource indicated by the resource gifting instruction from an account corresponding to the program viewer client to an account corresponding to the program provider client.

The backend server further includes:

a fourth receiving module 1790, configured to: when the program information is a program identifier, receive a program application request which is sent by the program provider client and carries interaction information; and an identifier sending module 1791, configured to allocate a program identifier to the program according to the program application request obtained by the fourth receiving module 1790, and send the program identifier to the program provider client, the program provider client being configured to send the program identifier to broadcasting equipment for broadcasting.

The first processing module 1730 includes:

a list determining unit 1731, configured to determine an interaction list according to the program information, the interaction list including interaction information of the program in each period of time; and an information searching unit 1732, configured to determine a period of time to which a current moment belongs, and search the interaction list determined by the list determining unit 1731 for interaction information corresponding to the period of time.

In conclusion, the backend server provided in this embodiment of this application receives program information sent by a program viewer client, and then can provide interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The backend server makes it more efficient and convenient to participate in an interaction activity.

Reward information is sent to each program viewer client whose resource gifting instruction has been executed successfully, and a reward item can be sent to the program viewer, to motivate the program viewer to gift a resource.

Figure 18:
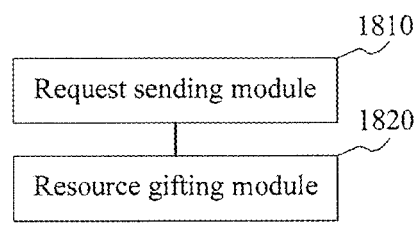
FIG. 18 is a structural block diagram of a client according to an embodiment of this application.

Referring to FIG. 18, FIG. 18 is a structural block diagram of a client according to an embodiment of this application. The client includes:

a request sending module 1810, configured to send an interaction request to a playing device when the playing device is playing a program, the interaction request being used for instructing the playing device to send program information of the currently played program to a backend server, the backend server being configured to determine, from pre-stored interaction information, interaction information corresponding to the program information and send the interaction information to a display device for displaying, and the display device being the playing device or the client; and a resource gifting module 1820, configured to display a resource gifting entry, and send a resource gifting instruction to the backend server according to a resource gifting operation triggered based on the resource gifting entry, the backend server being configured to execute the resource gifting instruction, and the resource gifting entry being an operation entry for gifting a resource to a performer of the program.

In conclusion, the client provided in this embodiment of this application instructs a playing device to send program information to a backend server, and then can obtain interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The client makes it more efficient and convenient to participate in an interaction activity.

Figure 19:
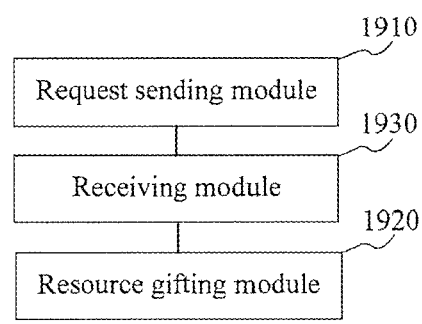
FIG. 19 is a structural block diagram of a client according to another embodiment of this application.

Referring to FIG. 19, FIG. 19 is a structural block diagram of a client according to another embodiment of this application. The client includes:

a request sending module 1910, configured to send an interaction request to a playing device when the playing device is playing a program, the interaction request being used for instructing the playing device to send program information of the currently played program to a backend server, the backend server being configured to determine, from pre-stored interaction information, interaction information corresponding to the program information and send the interaction information to a display device for displaying, and the display device being the playing device or the client; and a resource gifting module 1920, configured to display a resource gifting entry, and send a resource gifting instruction to the backend server according to a resource gifting operation triggered based on the resource gifting entry, the backend server being configured to execute the resource gifting instruction, and the resource gifting entry being an operation entry for gifting a resource to a performer of the program.

When the display device is the client, the client further includes:

a receiving module 1930, configured to receive the interaction information sent by the playing device, the interaction information being sent by the backend server to the playing device.

When the display device is the playing device, the resource gifting module 1920 is specifically configured to:

send a resource gifting instruction to the playing device according to a resource gifting operation triggered based on the resource gifting entry, the playing device being configured to forward the resource gifting instruction to the backend server.

The request sending module 1910 is specifically configured to:

receive a shaking instruction, and send the interaction request to the playing device according to the shaking instruction.

In conclusion, the client provided in this embodiment of this application sends program information to a backend server, and then can obtain interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The client makes it more efficient and convenient to participate in an interaction activity.

A shaking instruction is received; an interaction request is sent to the playing device according to the shaking instruction, so that the program viewer can initiate interaction by using only a simple operation, making it more efficient and convenient to participate in the interaction activity.

Figure 20:
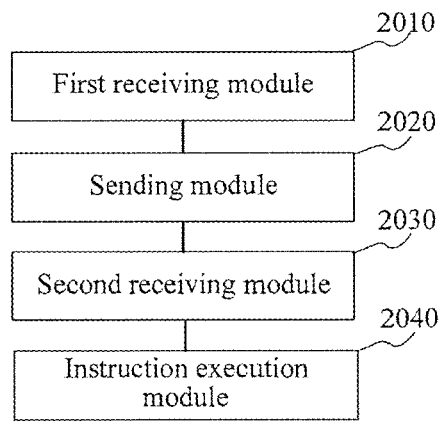
FIG. 20 is a structural block diagram of a backend server according to an embodiment of this application.

Referring to FIG. 20, FIG. 20 shows a backend server according to another embodiment of this application. The backend server include:

a first receiving module 2010, configured to receive program information of a currently played program sent by a playing device, the program information being sent by the playing device after receiving an interaction request sent by a client;

a sending module 2020, configured to determine, from pre-stored interaction information, interaction information corresponding to the program information received by the first receiving module 2010, and send the interaction information to a display device for displaying, the display device being the playing device or the client;

a second receiving module 2030, configured to receive a resource gifting instruction sent by the client, the resource gifting instruction being sent by the client to the backend server according to a resource gifting operation triggered based on a resource gifting entry displayed by the client, and the resource gifting entry being an operation entry for gifting a resource to a performer of the program; and an instruction execution module 2040, configured to execute the resource gifting instruction received by the second receiving module 2030.

When the display device is the client, the sending module 2020 is specifically configured to:

send the interaction information to the playing device, the playing device being configured to forward the interaction information to the client for displaying.

When the display device is the playing device, the second receiving module 2030 is specifically configured to:

receive a resource gifting instruction sent by the playing device, the resource gifting instruction being sent to the playing device by the client according to a resource gifting operation triggered based on the resource gifting entry and being forwarded by the playing device.

In conclusion, the backend server provided in this embodiment of this application receives program information sent by a playing device, and then can provide interaction information and a resource gifting entry that correspond to the program information, so that a program viewer can gift a resource to a performer of the program with only a simple operation, resolving the problem that it is difficult to participate in an interaction activity because when gifting a resource to a performer of a program by means of an expensive SMS fee, a user needs to manually input content of a text message. The backend server makes it more efficient and convenient to participate in an interaction activity.

It should be noted that, when the program interaction system provided in the foregoing embodiment performs program interaction, division of the foregoing functional modules is only described for exemplary purposes. In an actual application, the foregoing functions may be allocated to be accomplished by different functional modules according to requirements, that is, the internal structure of the program interaction system is divided into different functional modules, to accomplish all or some of the foregoing functions. In addition, the program interaction system provided in the foregoing embodiment belongs to the same concept as the embodiment of the program interaction method. For a specific implementation process of the program interaction system, refer to the method embodiment, and details are not described herein again.

The sequence numbers of the preceding embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely exemplary embodiments of this application, but are not intended to limit the present disclosure. Any modification, equivalent replacement, or improvement made within the spirit and principle of the present disclosure shall fall within the protection scope of this application.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A non-transitory computer-readable storage medium having instructions stored thereon which when executed by a processor of a program viewer client cause the processor to perform:
   sending program information identifying a currently watched program to a backend server;
   receiving interaction information from the backend server, the interaction information indicating one or more performers associated with the currently watched program identified by the program information;
   displaying the interaction information and a resource gifting interface, the resource gifting interface being configured to
      receive a user request to transfer a resource to a performer of the one or more performers of the currently watched program;
      display an amount of the resource to be transferred to the performer; and
      receive a shaking instruction during display of the amount of the resource and replace the displayed amount with a randomly generated amount of the resource in response to the shaking instruction; and
   sending a resource gifting instruction to the backend server according to a resource gifting operation triggered by the user request, the backend server being configured to execute the resource gifting instruction to transfer the randomly generated amount of the resource to the performer of the currently watched program.

2. The non-transitory computer-readable storage medium according to claim 1, wherein after the sending the resource gifting instruction to the backend server, the instructions which when executed by the processor cause the processor to perform:
   displaying reward information received from the backend server, the reward information being received from the backend server when the resource gifting instruction has been executed successfully, and the reward information indicating a reward item that is provided in response to the resource gifting operation; and
   receiving the reward item according to the reward information.

3. The non-transitory computer-readable storage medium according to claim 1, wherein after the displaying the resource gifting interface, the instructions which when executed by the processor cause the processor to perform:
   as part of the displaying the amount of the resource to be transferred to the performer,
      determining an initial random amount of the resource to transfer to the performer of the currently watched program; and
      displaying at least one of the initial random amount and an input field for an input amount of the resource to transfer to the performer of the currently watched program.

4. The non-transitory computer-readable storage medium according to claim 1, wherein the sending the program information identifying the currently watched program to the backend server comprises:
   receiving an interaction shaking instruction;
   acquiring the program information identifying the currently watched program in response to the interaction shaking instruction; and
   sending the program information to the backend server.

5. The non-transitory computer-readable storage medium according to claim 4, wherein the acquiring the program information identifying the currently watched program according to the interaction shaking instruction comprises:
   acquiring a voice signal in a current environment by using a microphone in response to the interaction shaking instruction, the voice signal being included in the program information; or
   receiving, in response to the interaction shaking instruction, a program identifier that is broadcast by broadcasting equipment with the currently watched program, the program identifier being included in the program information.

6. A method for interaction, the method comprising:
   receiving, by circuitry of a backend server, interaction information of a provided program from a program provider client;
   receiving, by the circuitry of the backend server, program information identifying a currently watched program from a program viewer client;
   determining, by the circuitry of the backend server, that the provided program corresponds to the currently watched program and the interaction information of the provided program corresponds to the program information identifying the currently watched program;
   sending, by the circuitry of the backend server, the interaction information to the program viewer client, the interaction information indicating one or more performers associated with the currently watched program identified by the received program information;
   receiving, by the circuitry of the backend server, a resource gifting instruction from the program viewer client after the program viewer client
      (i) displays the interaction information and a resource gifting interface that is configured to receive a user request to transfer a resource to a performer of the one or more performers of the currently watched program,
      (ii) displays an amount of the resource to be transferred to the performer, and (iii) receives a shaking instruction during display of the amount of the resource and replaces the displayed amount with a randomly generated amount of the resource in response to the shaking instruction; and executing, by the circuitry of the backend server, the resource gifting instruction to transfer the randomly generated amount of the resource to the performer of the currently watched program.

7. The method according to claim 6, wherein after the executing the resource gifting instruction, the method further comprises:
obtaining, by the circuitry of the backend server, reward information; and
sending, by the circuitry of the backend server, the reward information to the program viewer client when the resource gifting instruction has been executed successfully, the reward information indicating a reward item that is provided in response to the resource gifting operation, and the program viewer client being configured to display the reward information and receive the reward item according to the reward information.

8. The method according to claim 6, wherein after the executing the resource gifting instruction, the method further comprises:
obtaining, by the circuitry of the backend server, user information from a plurality of program viewer clients associated with a resource gifting instruction that has been executed successfully, user information of a specific program view client including a user identifier of the program view client and an amount of a resource to transfer to the performer of the currently watched program; and
sending, by the circuitry of the backend server, the user information of the plurality of program viewer clients to the program provider client, the program provider client being configured to sort the user identifiers according to the amount of the resource, and display the sorted user identifiers.

9. The method according to claim 6, wherein the executing the resource gifting instruction comprises:
transferring, by the circuitry of the backend server, the randomly generated amount of the resource indicated by the resource gifting instruction from an account corresponding to the program viewer client to an account corresponding to the program provider client.

10. The method according to claim 6, further comprising:
receiving, by the circuitry of the backend server, a program application request which is sent by the program provider client and carries interaction information, wherein the program information is a program identifier;
allocating, by the circuitry of the backend server, the program identifier to the program according to the program application request; and
sending, by the circuitry of the backend server, the program identifier to the program provider client, the program provider client being configured to send the program identifier to broadcasting equipment for broadcasting.

11. The method according to claim 6, wherein the determining that the interaction information corresponds to the program information comprises:
determining, by the circuitry of the backend server, an interaction list according to the program information, the interaction list including interaction information of the program in a plurality of time periods;

determining, by the circuitry of the backend server, a current time period; and
searching, by the circuitry of the backend server, the interaction list for the interaction information corresponding to the current time period.

12. A non-transitory computer-readable storage medium having instructions stored thereon which when executed by a processor of a client device cause the processor to perform:
sending an interaction request to a playing device when the playing device is currently playing a program, the interaction request instructing the playing device to send program information identifying the currently played program to a backend server, the backend server being configured to determine, from pre-stored interaction information, interaction information that corresponds to the program information, the interaction information indicating one or more performers associated with the currently played program identified by the program information;
displaying a resource gifting interface that is configured to
receive a user request to transfer a resource to a performer of the one or more performers of the currently played program;
display an amount of the resource to be transferred to the performer; and
receive a shaking instruction during display of the amount of the resource and replace the displayed amount with a randomly generated amount of the resource in response to the shaking instruction, and
sending a resource gifting instruction to the backend server according to a resource gifting operation triggered by the user request, the backend server being configured to execute the resource gifting instruction to transfer the randomly generated amount of the resource to the performer of the currently played program.

13. The non-transitory computer-readable storage medium according to claim 12, wherein the processor of the client device is further configured to perform:
receiving the interaction information from the playing device, the interaction information being sent by the backend server to the playing device.

14. The non-transitory computer-readable storage medium according to claim 12, wherein the backend server sends the interaction information to the playing device, the sending the resource gifting instruction to the backend server comprises:
sending the resource gifting instruction to the playing device according to the resource gifting operation triggered by the user request, the playing device being configured to forward the resource gifting instruction to the backend server.

15. The non-transitory computer-readable storage medium according to claim 12, wherein the sending the interaction request to the playing device comprises:
receiving an interaction shaking instruction; and
sending the interaction request to the playing device in response to the interaction shaking instruction.

16. A method for interaction, the method comprising:
receiving, by circuitry of a backend server, program information identifying a currently played program from a playing device, the program information is sent by the playing device after the playing device receives an interaction request from a client device;
determining, by the circuitry of the backend server, from pre-stored interaction information, interaction information indicating one or more performers associated with the currently played program identified by the program information;

receiving, by the circuitry of the backend server, a resource gifting instruction from the client device, the resource gifting instruction being sent by the client device to the backend server in response to a user request that is received by a resource gifting interface displayed by the client device, the resource gifting interface being configured to receive the user request to transfer a resource to a performer of the one or more performers of the currently played program;

display an amount of the resource to be transferred to the performer;

receive a shaking instruction during display of the amount of the resource and replace the displayed amount with a randomly generated amount of the resource in response to the shaking instruction; and executing, by the circuitry of the backend server, the resource gifting instruction to transfer the randomly generated amount of the resource to the performer of the currently played program.

17. The method according to claim 16, further comprising:

sending, by the circuitry of the backend server, the interaction information to the playing device, the playing device being configured to forward the interaction information to the client device for displaying.

18. The method according to claim 16, further comprising:

sending, by the circuitry of the backend server, the interaction information to the playing device for displaying at the playing device; and receiving, by the circuitry of the backend server, a resource gifting instruction from the playing device, the resource gifting instruction being sent to the playing device by the client device according to the resource gifting operation triggered by the user request and being forwarded by the playing device.

19. A backend server, comprising:
processing circuitry configured to receive interaction information of a program from a program provider client;

receive program information identifying a currently watched program from a program viewer client;

determine the interaction information that corresponds to the program information;

send the interaction information to the program viewer client, the interaction information indicating one or more performers associated with the currently watched program identified by the received program information;

receive a resource gifting instruction from the program viewer client after the program viewer client (i) displays the interaction information, and a resource gifting interface that is configured to receive a user request to transfer a resource to a performer of the one or more performers of the currently watched program, (ii) displays an amount of the resource to be transferred to the performer, and (iii) receives a shaking instruction during display of the amount of the resource and replaces the displayed amount with a randomly generated amount of the resource in response to the shaking instruction; and execute the resource gifting instruction to transfer the randomly generated amount of the resource to the identified performer of the currently watched program.

20. The backend server according to claim 19, wherein the processing circuitry is further configured to:

after the resource gifting instruction is executed, obtain reward information, and send the reward information to the program viewer client when the resource gifting instruction has been executed successfully, the reward information indicating a reward item that is provided in response to execution of the resource gifting instruction, and the program viewer client being configured to display the reward information and receive the reward item according to the reward information.

* * * * *